United States Patent
Sun et al.

(10) Patent No.: US 8,948,776 B2
(45) Date of Patent: Feb. 3, 2015

(54) SECONDARY USER SELECTION IN COOPERATIVE SENSING SCHEDULING

(71) Applicant: The Hong Kong University of Science and Technology, Hong Kong (CN)

(72) Inventors: Xiangxia Sun, New Territories (HK); Tengyi Zhang, Kowloon (HK); Hin Kwok Tsang, New Territories (HK)

(73) Assignee: Dynamic Invention LLC, Victoria Mahe (SC)

( * ) Notice: Subject to any disclaimer, the term of this patent is extended or adjusted under 35 U.S.C. 154(b) by 74 days.

(21) Appl. No.: 13/738,924

(22) Filed: Jan. 10, 2013

(65) Prior Publication Data

US 2014/0066085 A1 Mar. 6, 2014

Related U.S. Application Data

(60) Provisional application No. 61/697,237, filed on Sep. 5, 2012.

(51) Int. Cl.
*H04W 72/00* (2009.01)
*H04W 72/08* (2009.01)

(52) U.S. Cl.
CPC .............. *H04W 72/082* (2013.01); *Y02B 60/50* (2013.01)
USPC ............ 455/454; 455/507; 455/509; 370/338

(58) Field of Classification Search
CPC .............. H04W 16/14; H04W 72/085; H04W 72/0413
USPC .................... 455/446, 454, 507–509; 370/338
See application file for complete search history.

(56) References Cited

U.S. PATENT DOCUMENTS

| | | | |
|---|---|---|---|
| 2009/0186646 A1* | 7/2009 | Ahn et al. | 455/509 |
| 2009/0247201 A1* | 10/2009 | Ye et al. | 455/509 |
| 2010/0093360 A1* | 4/2010 | Choi et al. | 455/450 |
| 2010/0248760 A1* | 9/2010 | Li et al. | 455/500 |
| 2010/0271948 A1* | 10/2010 | Challapali et al. | 370/235 |
| 2011/0249587 A1* | 10/2011 | Deng et al. | 370/252 |
| 2012/0163355 A1* | 6/2012 | Heo et al. | 370/338 |
| 2012/0289236 A1* | 11/2012 | Xu et al. | 455/446 |
| 2012/0315855 A1* | 12/2012 | Li et al. | 455/67.7 |

OTHER PUBLICATIONS

W-Green. "Call for papers of 1st International Workshop on Green Wireless 2008", published online at [http://www.cwc.oulu.fi/workshops/W-Green2008.pdf], 2008, 1 page.
Gur, et al. "Green Wireless Communications via Cognitive Dimension: An Overview," IEEE Network, vol. 25, No. 2, pp. 50-56, Mar./Apr. 2011.

(Continued)

*Primary Examiner* — Nathan Taylor
(74) *Attorney, Agent, or Firm* — Amin, Turocy & Watson, LLP

(57) ABSTRACT

Cooperative spectral channel sensing techniques are applied in a cognitive radio network (CRN). Network characteristics and target parameter thresholds can be determined. An overall number of secondary users (SUs) assigned to sense a number of primary user (PU) channels can be determined. Further, it can be determined how many SUs to assign to sense each PU channel. In one aspect, SUs are allowed to access to PU channels based on spectrum opportunities determined by the cooperative spectral channel sensing techniques.

26 Claims, 14 Drawing Sheets

(56) References Cited

OTHER PUBLICATIONS

OFCOM. "Digital Dividend: Cognitive Access", published online at [http://www.ofcom.org.uk/consult/condocs/cognitive/summary], Feb. 16, 2009, 63 pages.

Zhang, et al. "Cooperative Sensing Scheduling for Energy-Aware Cognitive Radio Networks," IEEE International Conference on Communications (ICC), 2011, 6 pages.

Liang, et al. "Sensing-Throughput Tradeoff for Cognitive Radio Networks," IIEEE Transactions on Wireless Communications, vol. 7, No. 4, Apr. 2008, pp. 1326-1337.

Peh, et al. "Optimization of Cooperative Sensing in Cognitive Radio Networks: A Sensing-Throughput Tradeoff View," IEEE Transactions on Vehicular Technology, vol. 58, No. 9, Nov. 2009, pp. 5294-5299.

Letaif, et al. "Cooperative Spectrum Sensing", Cognitive Wireless Communication Networks, Springer, pp. 115-138, Oct. 2007.

Shen, et al. "Maximum Channel Throughput via Cooperative Spectrum Sensing in Cognitive Radio Networks," IEEE Transactions on Wireless Communications, vol. 8, No. 10, Oct. 2009, pp. 5166-5175.

\* cited by examiner

ILLUSTRATION OF VALUE OF $\Delta P(a^*(\kappa), \kappa)$

VALUE OF THE OBJECTIVE FUNCTION $U(a(\kappa), \kappa)$
WITH RESPECT TO DIFFERENT NUMBER OF PU CHANNELS

ALGORITHM 800

810 — INITIALIZATION SET $m = 1$, $J = 0$, $J' = 0$, $\Delta P = 0$ AND $\lambda = \dfrac{w_e \tau \phi T}{w_e(T-\tau-\eta)C_\beta \Pr(s_R=0)}$ 820 — REPEAT $\Delta P = P_f(m) - P_f(m+1), m = m + 1$ UNTIL $\Delta P < \lambda$ OR $m = \left\lceil \dfrac{M}{N} \right\rceil$ 830 — $J = m$ 840 — IF $\Delta P < \lambda$ THEN IF $P_f(J-1) - P_f(J) = \lambda$ THEN $k^* = (J-1)N, (J-1)N+1, \ldots, JN - 1$ AND $J' = J - 1$ ELSE $k^* = JN$ AND $J' = J$ ELSE $k^* = M$ AND $J' = J - 1$ 850 — $a^*(\kappa^*) = \{J', \ldots, J', (J'_1), \ldots, (J'+1)\}$ WHERE THE NUMBER OF $J'$ IS $(N - K)$ AND THE NUMBER OF $(J' + 1)$ IS $K$, $K$ IS THE REMAINDER OF THE DIVISION $\dfrac{k^*}{N}$ THEN STOP

FIG. 8

SECONDARY USER SELECTION IN COOPERATIVE SENSING SCHEDULING

RELATED APPLICATION

This application claims priority to U.S. Provisional Patent Application Ser. No. 61/697,237, filed on Sep. 5, 2012, entitled "SECONDARY USER SELECTION IN COOPERATIVE SENSING SCHEDULING: A SPECTRUM OPPORTUNITY-ENERGY TRADEOFF VIEW." The entirety of the aforementioned application is incorporated by reference herein.

TECHNICAL FIELD

This disclosure relates generally to wireless communications in connection with a communication network system, including cooperative sensing, e.g., the management of secondary nodes sensing primary node spectral channels in a cognitive radio network system.

BACKGROUND

Wireless networks are expected to meet people's ever growing demands. As these demands have grown, so too has information and communication technology (ICT) infrastructure's energy consumption and carbon dioxide ($CO_2$) emissions. For instance, it has been estimated that ICT infrastructure consumes three percent of the world wide energy and produce two percent of the world wide $CO_2$ emissions.

Recently, there has been some progress in understanding cooperative spectrum management and cognitive radio network (CRN) management. The possibility for green communications using CRNs and the tradeoff between opportunity and accuracy, which is referred to as the Cooperative Sensing Scheduling (CSS) problem, have started to be explored as well.

By way of general background, cognitive radios (CRs) are able to interact and learn from radio environments, and adaptively change their working parameters (power, bandwidth, frequency, etc.) to dynamically utilize unused primary users' spectrums. Typically, spectral channels are reserved or licensed for specific types of communications and specific types of users (e.g., military, consumer, cellular, television broadcasts, emergency channels, etc.). The terms primary user (PU) and PU channel represent a relationship between a type of user and the type's designated spectral channel. While, the term secondary user (SU) represents a relationship between types of users who are not designated for a specific spectrum and the specific spectral channel (e.g., PU channel). Accordingly, a type of user may be a PU in one instance and a SU in another instance. In CR parlance, "users" refer to devices.

In the United States, the Federal Communications Commission (FCC), and in other parts of the world other agencies (e.g., Ofcom in the United Kingdom) license and allocate spectrum in various bands. The total available spectrum is greater than the total licensed and allocated spectrum Likewise, the available licensed and allocated spectrum is often greater than the demand. However, the allocation and use of the spectrum can create crowding in limited spectral regions. One way to decrease crowding in limited spectral regions is to take users assigned to one spectrum and give them access to an underutilized spectrum. These SUs can, in some cases, utilize the PU channels. For example, a consumer user can utilize a military channel.

Due to its powerful cognitive capabilities, CR opens up a new direction and possibility for green communications. New functionalities introduced in CRN bring unparalleled agility, but at the same time introduce additional power consumption. Overhead, however, includes the spectrum sensing procedure, which is undertaken before secondary users can access the primary user channels.

The above-described conventional techniques are merely intended to provide an overview of some issues associated with current technology, and are not intended to be exhaustive. Other problems with the state of the art may become further apparent upon review of the following detailed description of the various non-limiting embodiments.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

In various non-limiting embodiments, systems and methods for cooperative spectral channel sensing and dynamic resource management are presented. In one aspect, a base station device can dynamically schedule SUs to access to unutilized or under-utilized PU channels based on predefined criteria. For example, a base station device can determine a number of SUs to select for sensing of PU channels, can determine a number of PU channels to select for sensing, and can determine a number of SUs to assign to sense each selected PU channel based on predetermined power management techniques.

In another aspect, a base station device can utilize predetermined criteria to dynamically assign and schedule SUs to sense PU channels. For example, a base station device can dynamically schedule a cooperative sensing scheme based on power consumption thresholds, network exploration thresholds, accuracy thresholds and throughput thresholds. In one aspect, various systems and methods disclosed herein can balance a network's characteristics through dynamic assignment of spectral channel sensing and granting access to PU channels.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 8 illustrates a flow diagram of facilitating dynamic sensing of spectral channels in a cognitive radio network in accordance with various embodiments.

DETAILED DESCRIPTION

Figure 1:
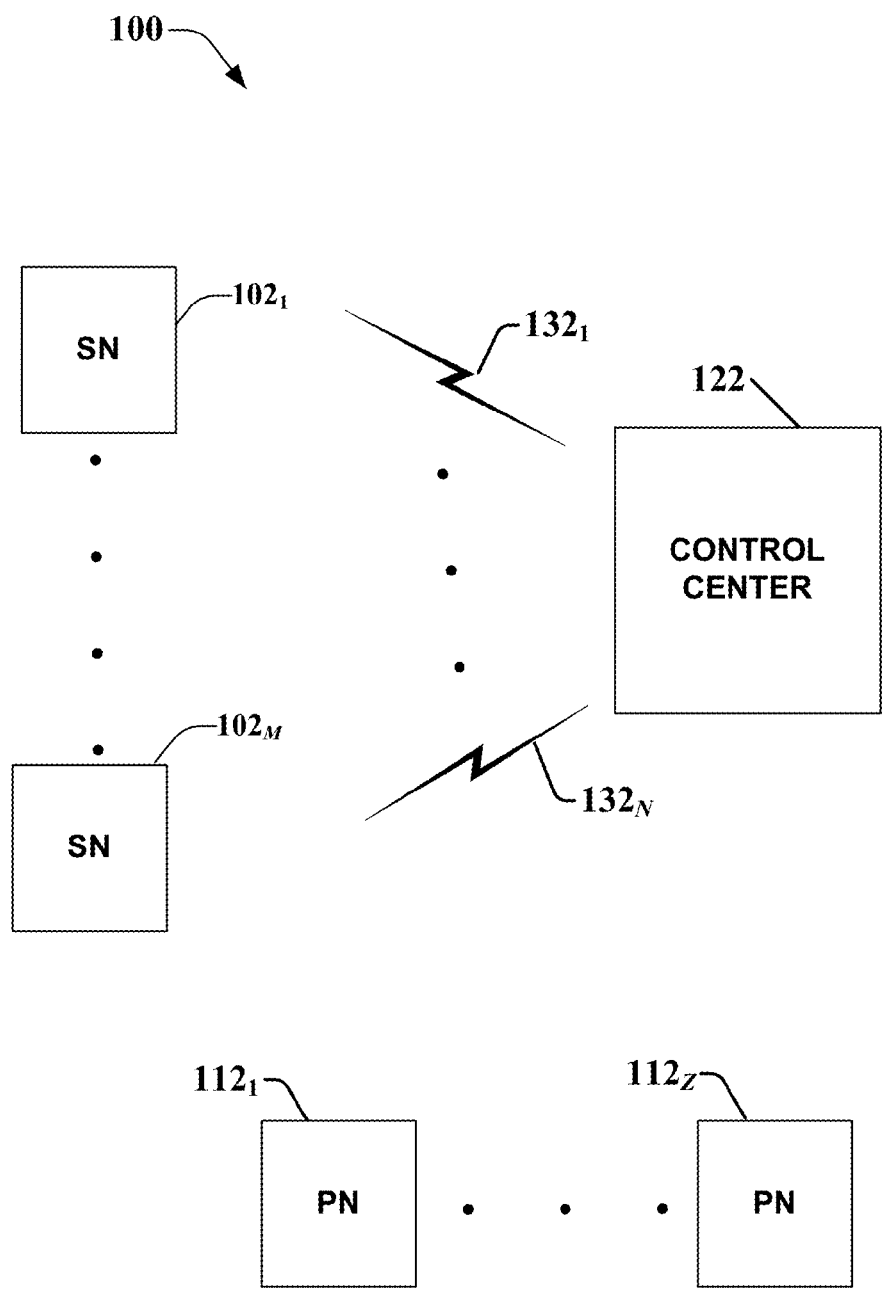
FIG. 1 illustrates a high level functional block diagram of a cognitive radio network in accordance with various embodiments.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The terms "node", "primary node", "secondary "node", "primary user", "secondary user", and the like, as used herein are used to refer to any apparatus which functions as a transmitter or receiver. As such, the terms may represent any type of communication device which may have both transmit and receive capabilities, such as, but not limited to, cellular phones, tablets, personal data assistants (PDA), radio devices, laptops, set top boxes, and the like. Further, the terms "spectrum", "spectral", "channel", and the like, as used herein, are used to refer to an aspect of communication, such as a range along the electromagnetic spectrum, designated for communication.

The terms "cognitive radio", "cognitive radio network", "CR", "CRN", "software defined radio" and the like as used herein are used to refer to any apparatus, system, article of manufacture, or combination of the like with cognitive capabilities. In one aspect, the terms may refer to software, software in execution, hardware, and/or software in combination with hardware utilized to form a communication network.

The systems and methods described herein, generally relate to secondary user (SU) selections and assignments in cooperative cognitive radio networks (CRNs). In one aspect, the more SUs a CRN selects for sensing, the better the sensing performance, and the higher the throughput can be. However, each SU selected for sensing also increases energy consumption and can increase $CO_2$ emissions. Therefore, there is a tradeoff between throughput and energy. In another aspect, assigning more SUs to sense one channel can improve sensing accuracy. However, in return a CRN can lose spectrum opportunity (exploration) since fewer channels are sensed and less candidate PU channels can be exploited. Therefore, there is also a tradeoff between opportunity and accuracy, referred as the Cooperative Sensing Scheduling (CSS) problem.

The various systems, methods, and apparatus described herein employ a two dimensional tradeoff management scheme to jointly optimize, or nearly optimize, power consumption, spectrum opportunity, accuracy, and/or throughput. In various examples, an efficient algorithm determines a number of SUs to select, and PU channels to sense in a given location or coverage area.

Various other embodiments provide for management of CRNs according to power management and resource management schemes. For example, a device is described having a resource management component that generates scheduling information. The device transmits scheduling data on a channel to selected SUs. The selected SUs can sense spectral channels according to the received data. In one aspect, the device can receive sensed data by the selected SUs. In another aspect, SUs may communicate directly with other SUs or PUs. Further, the device can send channel access information and can allow SUs access to PU channels.

In another aspect, a wireless communication method is derived comprising, generating control information and transmitting the control information through emission. The method can further comprise determining a number of SUs to issue sensing commands and determining channels to be sensed by SUs. The method may further include, aggregating sensed information and granting access to PU channels.

In yet another aspect, a device can include means for generating control information and means for transmitting the control information. Another device can include means for sensing channel spectrums, means for receiving sensed data, means for granting access to PU channels, and means for connecting to PU channels.

FIG. 1 illustrates a cognitive radio network (CRN) system 100 in accordance with various embodiments. Aspects of the systems, apparatuses or processes explained herein can constitute machine-executable components embodied within machine(s), e.g., embodied in one or more computer readable mediums (or media) associated with one or more machines. Such component, when executed by the one or more machines, e.g., computer(s), computing device(s), virtual machine(s), etc., can cause the machine(s) to perform the operations described.

In an aspect, system 100 can be a wireless communication network comprising various communication protocols (e.g., 3G, 4G, Long Term Evolution (LTE), and the like). In another aspect, the system 100 may be a multiple input multiple output (MIMO) network, CRN, and the like. The system 100 illustrated in FIG. 1 includes secondary nodes $102_1$-$102_M$, primary nodes $112_1$-$112_Z$, a central controller 122, and primary channels $132_1$-$132_N$. Secondary nodes $102_1$-$102_M$ and primary nodes $112_1$-$112_Z$ may represent any type of communication device which may have both transmit and receive capabilities, such as, but not limited to, cellular phones, tablets, personal data assistants (PDA), radio devices, laptops, set top boxes, and the like. The central controller 122 may be a stand-alone wireless communication device (e.g., base station) configured to communicate wirelessly with secondary nodes $102_1$-$102_M$ and primary nodes $112_1$-$112_Z$, or may be located within one of the secondary nodes $102_1$-$102_M$ or primary nodes $112_1$-$112_Z$. For example, a node can include a base station device, access point devices, and/or user devices.

FIG. 1 depicts secondary node $102_1$ to secondary node $102_M$. It is noted that M can be any positive integer and M secondary nodes can operate in system 100 in accordance with the subject disclosure. Further, primary node $112_1$ to primary node $112_Z$ are depicted, where Z can be any positive integer. Accordingly, Z primary nodes can operate in network 100 in accordance with the subject disclosure. In another aspect, network 100 consists of N primary channels $132_1$-$132_N$. A channel can be a spectral channel for electromagnetic communication. Channels can comprise licensed-band channels, un-licensed-band channels, peer-to-peer (e.g., mobile-to-mobile) ad hoc network systems often using unpaired unlicensed spectrums, 802.xx wireless LAN, BLUETOOTH and any other short- or long-range, wireless communication techniques, and the like. As used herein, the system 100 can constitute a CRN system with N primary channels $132_1$-$132_N$, M secondary nodes $102_1$-$102_M$, a central controller 122, and Z primary nodes $112_1$-$112_Z$.

According to an embodiment, primary nodes $112_1$-$112_Z$ and secondary nodes $102_1$-$102_M$ are configured to communicate with each other, and/or central controller 122. The term "cognitive radio network" or "software defined radio network" can refer to the condition that nodes cooperatively sense, select and manage radio resources. In other words, transceivers can detect available channels in wireless spectrum and accordingly change transmission or reception parameters so more wireless communications may run concurrently in a given spectrum band at a given place.

Secondary nodes $102_1$-$102_M$ can detect spectral channels along ranges of the electromagnetic spectrum. In various embodiments, secondary nodes $102_1$-$102_M$ can utilize cooperative spectrum sensing. In one aspect, secondary nodes can employ energy detectors to detect usage of a spectral channel. In another aspect, secondary nodes $102_1$-$102_M$ can detect a parameter of a spectral channel. It is noted that a sensing component can be integrated into a node (primary or secondary) or can be a separate component either internal or external to the node and still provide the functionality as herein described and considered within the scope of the disclosed subject matter. The exemplary energy detector can measure the energy of a signal transmitted by primary nodes $112_1$-$112_Z$ and received at the sensing component, over a predetermined bandwidth and for a predetermined period of time. Factors such as transmission frequency, the distance from the transmitter, interfering signals, and/or physical interference can affect the detection of the primary node transmission at the sensing component.

In various other examples, secondary nodes $102_1$-$102_M$ can utilize distributive sensing techniques, stationary Gaussian noise detectors, sophisticated feature detectors, and the like. In one example, feature detectors rely on the fact that, unlike stationary noise, most communication signals exhibit spectral correlation due to their built-in periodicities (features) such as carrier frequency, bit rate, and cyclic prefixes. Since the spectral correlation properties of different signals are usually unique, feature detection allows a cognitive radio to detect a specific primary signal buried in noise and interference.

In another embodiment, data sensed by secondary nodes $102_1$-$102_M$ can be transmitted to a control center 122. According to another embodiment, central controller 122 can include a base station which can be configured for scheduling and assigning secondary nodes $112_1$-$112_Z$ to sense primary channels $132_1$-$132_N$, collecting individual sensing results from secondary nodes $112_1$-$112_Z$, and making the final decision on an occupancy state of primary channels $132_1$-$132_N$. In this embodiment, $s_n=0$ and $s_n=1$ denote that the occupancy state of a channel n∈N being idle and busy, respectively. However, it is noted that an occupancy state may be represented by various other methods in related embodiments. One of skill in the art will appreciate that a control center 122 can comprise a component integrated into a node (primary or secondary) or can be a separate component either internal or external to the node and still provide the functionality as herein described and considered within the scope of the disclosed subject matter.

In one embodiment, it is assumed that network 100 works in a slotted frame structure and the length of each frame is fixed to T. Each frame consists of three durations: a fixed sensing duration τ, a fixed scheduling and results fusing duration η, and a data transmission duration T-τ-η. In the sensing duration, each secondary node 102 selected for sensing will sense primary channels $132_1$-$132_N$ using energy detection. In various embodiments, each secondary node $102_1$-$102_M$ can only sense one channel due to physical limitations. Suppose the primary channels $132_1$-$132_N$ are complex-valued phase-shift keying (PSK) signals while the noise is represented as a complex distribution whose real numbers and imaginary parts are bivariated Gaussian distributed (e.g., Circular Symmetric Complex Gaussian (CSCG)). In this disclosure, let detection probability and false alarm probability, be denoted by $p_d$ and $p_f$ respectively, where γ denotes a signal-to-noise ratio (SNR) of the primary channels $132_1$-$132_N$ received at secondary nodes $102_1$-$102_M$ and $f_s$ represents a sampling rate, $Q(\cdot)$ denotes tail probability of the standard Gaussian distribution and $Q^{-1}(\cdot)$ is the inverse of $Q(\cdot)$. In one aspect, τ and $f_s$ can be a constant determined by control center 122 for all secondary nodes 102. Then a relationship between $p_d$ and $p_f$ can be given by $$p_f = Q(\sqrt{2\gamma+1}Q^{-1}(p_d)+\sqrt{\tau f_s}\gamma).$$

In another aspect, each secondary node $102_1$-$102_M$ can report a one bit sensing result (idle or busy) to the BS after sensing its assigned primary channel $132_1$-$132_N$. Then control center 122 can perform results fusion to generate decisions on the occupancy state of primary channels $132_1$-$132_N$ using a threshold value of 1 for an "OR" fusion rule, a value of M for an "AND" fusion rule, and a value of M/2 for a "Majority" fusion rule. Further, suppose a primary channel $132_1$-$132_N$ is cooperatively sensed by secondary nodes $102_1$-$102_M$. Central controller 122 can set received SNRs at secondary nodes $102_1$-$102_M$ as identical and denoted as γ. In this case, the sensing performance of channel n at the central controller 122 can be described as $$P_d^n(m) = 1 - [1 - p_d^n(m)]^m, P_f^n(m) = 1 - [1 - p_f^n(m)]^m$$

where $p_d^n(m)$ and $p_f^n(m)$ denote the detection probability and false alarm probability of individual secondary nodes $102_1$-$102_M$ that senses primary channel n, respectively.

In one embodiment, system 100 can determine how often to sense the availability of channels and in which order to sense those channels. Specifically, sensing-period optimization mechanisms and an optimal channel-sequencing algorithms, can be utilized. In one aspect, sensing is periodic and determined based on aspects presented herein. In another aspect, sensing can occur when a threshold number of secondary nodes $102_1$-$102_M$ are waiting for access to a channel.

Figure 2:
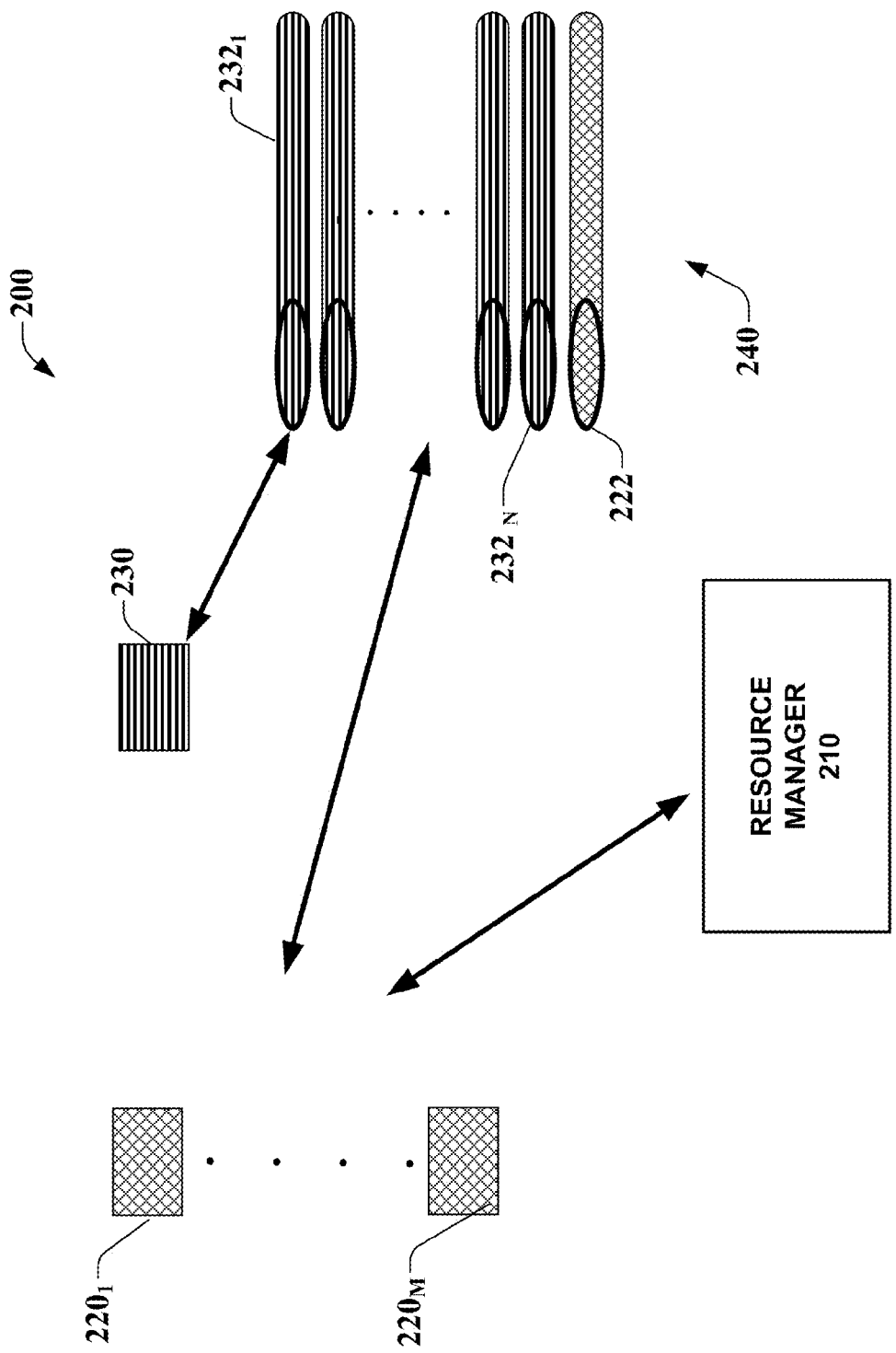
FIG. 2 illustrates a functional illustration of a cognitive radio network capable of managing spectral channels in accordance with various embodiments.

FIG. 2 illustrates a model system 200 operable in accordance with embodiments. System 200 depicts nodes capable of communicating via a CRN. As seen in FIG. 2, a radio resource manager 210 operates in detect mode, wherein radio resource manager 210 monitors elements of system 200 to determine availability of primary channels (i.e., whether secondary nodes should be allowed to access primary channels). As illustrated, system 200 includes radio resource manager 210, secondary nodes $220_1$-$220_M$, where M is a real integer, a primary node 230, and a plurality of channels 240 comprising primary channels $232_1$-$232_N$, where N is a real integer, and a secondary channel 222. Within such embodiment, the availability of radio resources depends on the number of nodes and the number of in use channels that are occupying radio channels 240 (here seven channels are illustrated).

In one example, secondary nodes $220_1$-$220_M$ can be designated to communicate via secondary channel 222. However, secondary channel 222 can experience a demand (e.g., nodes requesting services or resources) greater than secondary channel 222 can support or greater than secondary channel 222 can support without loss in communication quality. In another aspect, any of primary channels $232_1$-$232_N$ can be idle at a given time. As illustrated, a primary node 230 can access a primary channel $232_1$-$232_N$ at a given time, while other primary channels $232_1$-$232_N$ remain idle. In another example, every primary channel $232_1$-$232_N$ can be idle simultaneously.

In one embodiment, radio resource manager 210 can determine a target number of secondary nodes $220_1$-$220_M$ to select for sensing. In one aspect, as the number of secondary nodes $220_1$-$220_M$ increases so will potential throughput (e.g., processing of secondary node $220_1$-$220_M$ requests), as more primary channels $232_1$-$232_N$ can be sensed and utilized. However, as the number of secondary nodes $220_1$-$220_M$ increase, the total energy consumption and $CO_2$ output in the system 200 also increase. Accordingly, radio resource manager 210 can detect and select an appropriate target number of secondary nodes $220_1$-$220_M$ to select for sensing based on network parameters to achieve a predetermined balance between throughput and power consumption.

In another embodiment, radio resource manager 210 can determine a number of secondary nodes $220_1$-$220_M$ to sense a single primary channel $232_1$-$232_N$. Increasing the number of secondary nodes $220_1$-$220_M$ per primary channel $232_1$-$232_N$, can improve sensing accuracy as more secondary nodes $220_1$-$220_M$ sensing each channel can increase accuracy. However, the increased number of secondary nodes $220_1$-$220_M$ sensing a single primary channel will reduce spectrum opportunity sensing (i.e., less spectral channels are explored since more secondary nodes sense each channel). Accordingly, radio resource manager 210 can determine a number of secondary nodes $220_1$-$220_M$ to select for sensing respective primary channels $232_1$-$232_N$ based on network parameters to achieve a predetermined balance between spectrum opportunity exploration and sensing accuracy.

According to an embodiment, the assignment of secondary nodes $220_1$-$220_M$ is given by $\{a_n | \Sigma_{n=1}^{N} a_n = K, n \in N\}$ where κ is the total number of secondary nodes $220_1$-$220_M$ participating in sensing, (κ<M), $a_n$ is the number of secondary nodes $220_1$-$220_M$ assigned to sense primary channels n∈N. The expected throughput of the CRN can be expressed as $$\bar{R}(a(k)) = \frac{T-\tau-\eta}{T} \sum_{n: a_n > 0} \{C_0[1-P_f^n(a_n)]Pr(s_n=0) + C_1[1-P_d^n(a_n)]Pr(s_n=1)\}$$

where $C_0$ and $C_1$ denote a throughput of a CRN when it operates in the absence and presence of primary nodes, respectively, $Pr(s_n=0)$ and $Pr(s_r=1)$ denote the stationary probability that primary channel n is idle and busy, respectively. It is noted that $C_0 \gg C_1$ and the throughput of the CRN when primary node 230 is absent dominates. As a result, the expected throughput can be rewritten as $$R(a(\kappa)) = \frac{T - \tau - \eta}{T} \sum_{n:a_n>0} \{C_0[1 - P_f^n(a_n)]Pr(s_n = 0)\}.$$

According to another embodiment, energy consumption of the CRN during the sensing process can be given by $E(\kappa) = \tau \phi \kappa$, where $\phi$ is a power spent for sensing per time unit. After taking both expected throughput and energy consumption into consideration, a utility function of an Opportunity-Energy (OE) tradeoff can be defined as $$U(a(\kappa),\kappa) = w_t R(a(\kappa)) - w_e E(\kappa),$$

where $w_e$ and $w_t$ are the weighting factors for throughput and energy consumption, respectively. These two weighting factors reflect how the CRN evaluates the importance of the two conflicting objectives mentioned above.

According to another embodiment, radio resource manager 210 can protect the priority of primary node 230 In one aspect, this can be achieved by requiring secondary nodes 220₁-220_M to achieve a specific probability of detection, $\overline{P}_d^n$, for each primary channel 232₁-232_N they sense. Without loss of generality, $\overline{P}_d^n = \overline{P}_d$ and $\forall n \in N$ can be assumed, in various implementations. Therefore, a OE problem can be mathematically represented as $$(P1): \max_{a(\kappa),\kappa} U(a(\kappa),\kappa)$$
$$s.t. \quad \kappa \leq M$$
$$\sum_{n=1}^{N} a_n = \kappa, a_n \in \{0, 1, \ldots, \kappa\}$$
$$P_d^n(a_n) \geq \overline{P}_d, \forall n \in N.$$

In another aspect, an optimal solution of problem can be achieved with equality constraints. Accordingly, system 200 can intelligently select a number of secondary nodes, to sense a target number of primary signals based on network parameters. In another aspect, system 200 can balance energy consumption, sensitivity, accuracy, and throughput by dynamically scheduling primary signal sensing and access.

It is noted that the number of secondary nodes 220₁-220_M chosen for sensing and the number chosen to sense each primary channel has been described above. However, system 200 can also choose which secondary nodes 220₁-220_M to select out of a total number of secondary nodes available in a system. In one aspect, resource manager 210 determine characteristics of secondary nodes and select the number of secondary nodes 220₁-220_M chosen for sensing and the number chosen to sense each primary channel based on the characteristics. In one example, a characteristic can include, but is not limited to, a geographic location (e.g., as determined by global positioning satellites (GPS), wireless access points, triangulation, etc.), processor speed associated with the node device, and a length of time a node device has been waiting for a channel.

Figure 3:
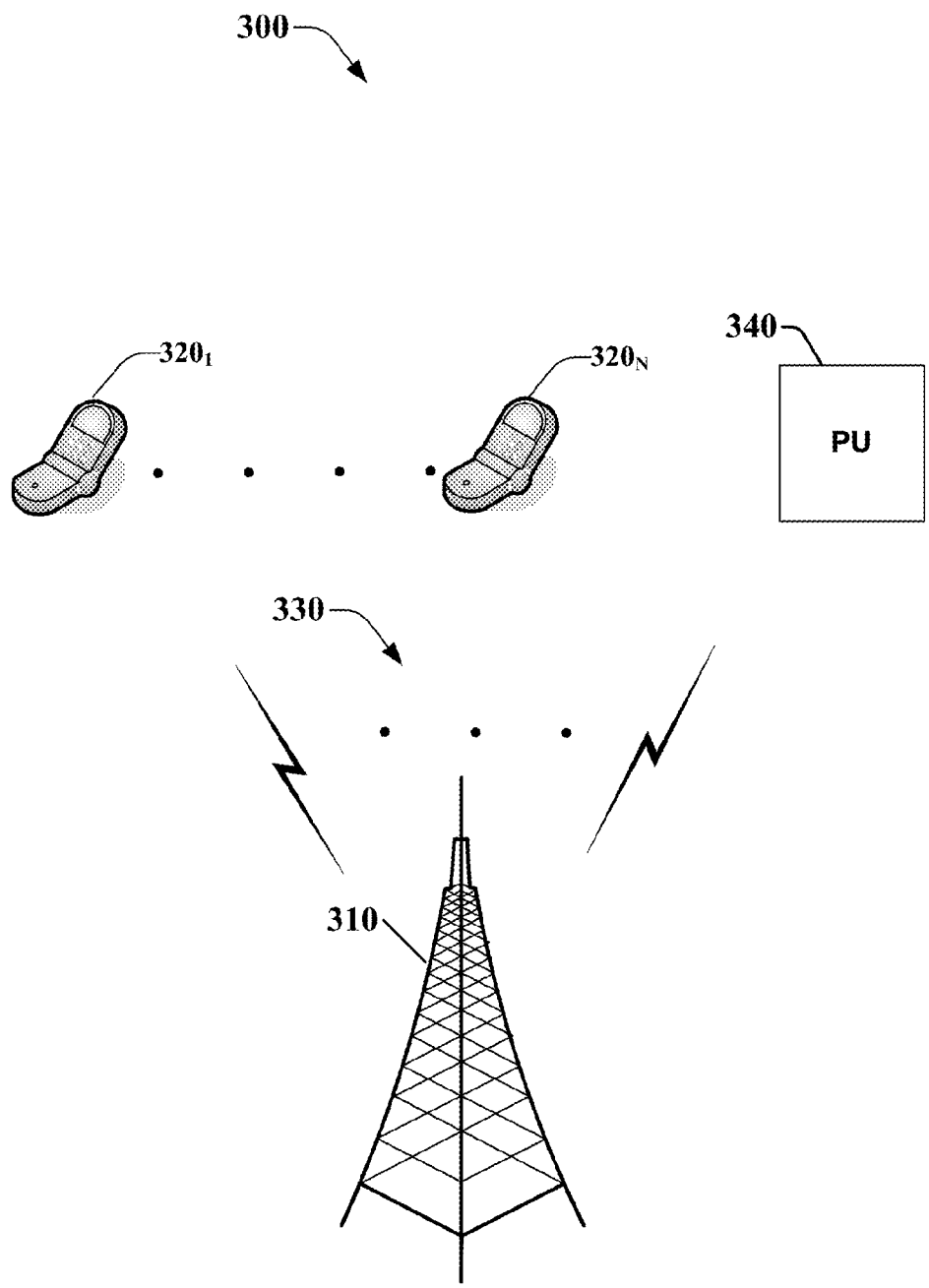
FIG. 3 presents a high level schematic diagram of a cognitive radio network including a base station, in accordance with various embodiments.

Referring now to FIG. 3, presented is a high level block diagram of a system 300 configured to employ a spectrum opportunity-energy tradeoff in a cooperative sensing CRN.

As seen in FIG. 3, system 300 includes a base station 310, secondary nodes 320₁-320_N, a plurality of channels 330 and primary node 340. System 300 can represent a CRN, in accordance with various aspects of this disclosure.

In one aspect, base station 310 can comprise one or more base stations configured to send and receive data to secondary nodes 320₁-320_N. However, it is noted that the one or more base stations can be configured to send and receive data to primary node 340. Data can be sent and received via one or more channels 330. In another aspect, base station 310 can manage channels 330. Channels 330 can each represent a distinct spectral range, such as those designated by governing bodies.

In one example, base station 310 can determine characteristics of the CRN. A characteristic can be a count of secondary nodes 320₁-320_N in a coverage area of the CRN, a count of primary nodes in the coverage area, a count of active channels in the coverage area, distance between nodes and other nodes and/or a signal source, and the like. In another example, base station 310 can issue commands to nodes, such as secondary nodes 320₁-320_N. Commands can comprise commands to initiate sensing of a particular channel. Sensing can include energy sensing and other techniques capable of determining if respective channels of the channels 330 are idle or busy.

In another embodiment, base station 310 determines cooperative sensing parameters, such as a first number of secondary nodes 320₁-320_N to select for sensing, a quantity of channels 330 to select for sensing, and a second number of secondary node 320₁-320_N from the selected secondary nodes to sense each selected channels 330. Base station 310 can determine said cooperative sensing parameters based on characteristics of the CRN and network thresholds, such as accuracy thresholds (e.g., accuracy of sensed statuses of channels expected as a result of sensing), throughput thresholds (e.g., data expected to be processed as a result of sensing), energy consumption thresholds (e.g., energy expected to be consumed as a result of sensing), and network exploration thresholds (e.g., a coefficient representing channels sensed compared to channels available for sensing), for example. In another aspect, base station 310 can determine thresholds and parameters based on various aspects of this disclosure.

In one example, base station 310 can determine a target number of secondary nodes 320₁-320_N needed to meet one or more network thresholds (e.g., accuracy, power consumption, network exploration, and/or throughput thresholds). Further, base station 310 can determine a target number of channels 330 to sense and a target number of secondary nodes 320₁-320_N to assign sensing particular channels according to network thresholds (e.g., accuracy, power consumption, network exploration, and/or throughput thresholds).

In one embodiment, secondary nodes 320₁-320_N can each sense one or more channels 330 according to received instructions. For example, secondary nodes 320₁-320_N can include energy sensing components configured to detect a status of a spectral channel 330. It is noted that primary node 340 and other devices can not receive instructions to detect a channel status. However, in some embodiments primary node 340 and other devices can receive instructions to detect a channel status (e.g., non-active primary nodes can be selected to receive instructions). Secondary nodes 320₁-320_N can further comprise components enabling sending of a response to base station 310. For example, a transceiver component can send a response to bases station 310, such as a one bit binary response indicating whether a channel of the channels 330 are busy or idle. In one aspect, the response can, but need not, be a one bit Boolean response.

In another embodiment, base station 310 can receive data in response to a command. For example, base station 310 can send a command to k select secondary nodes of secondary nodes $320_1$-$320_N$, where k is an integer greater than or equal to 1 and less than or equal to N, to sense a select channel of channels 330. The selected k secondary nodes $320_1$-$320_N$ can return a response. In various examples, base station 310 can process the response (e.g., in parallel, or as received). Base station 310 can further allow various secondary nodes $320_1$-$320_N$ to connect and/or utilize one or more channels 330 based on the processed responses. In one aspect, allowing nodes to connect to a channel can include issuing a command to one or more secondary nodes $320_1$-$320_N$, the command comprising instructions to connect to a channel.

It is noted that base station 310 can decide which secondary nodes $320_1$-$320_N$ to grant access based on a number of conventional techniques. Likewise, base station 310 can also manage primary node 340 priority. For example, if a secondary node $320_1$-$320_N$ is utilizing a primary channel of the channels 300 and a primary node 340 requests a service (e.g., attempts to connect) then the secondary node utilizing the channel may be forced to terminate a connection with the channel, allowing the primary node to access to the channel. It is noted that various priority schemes can be utilized to ensure primary nodes priority to primary channels 330.

Figure 4:
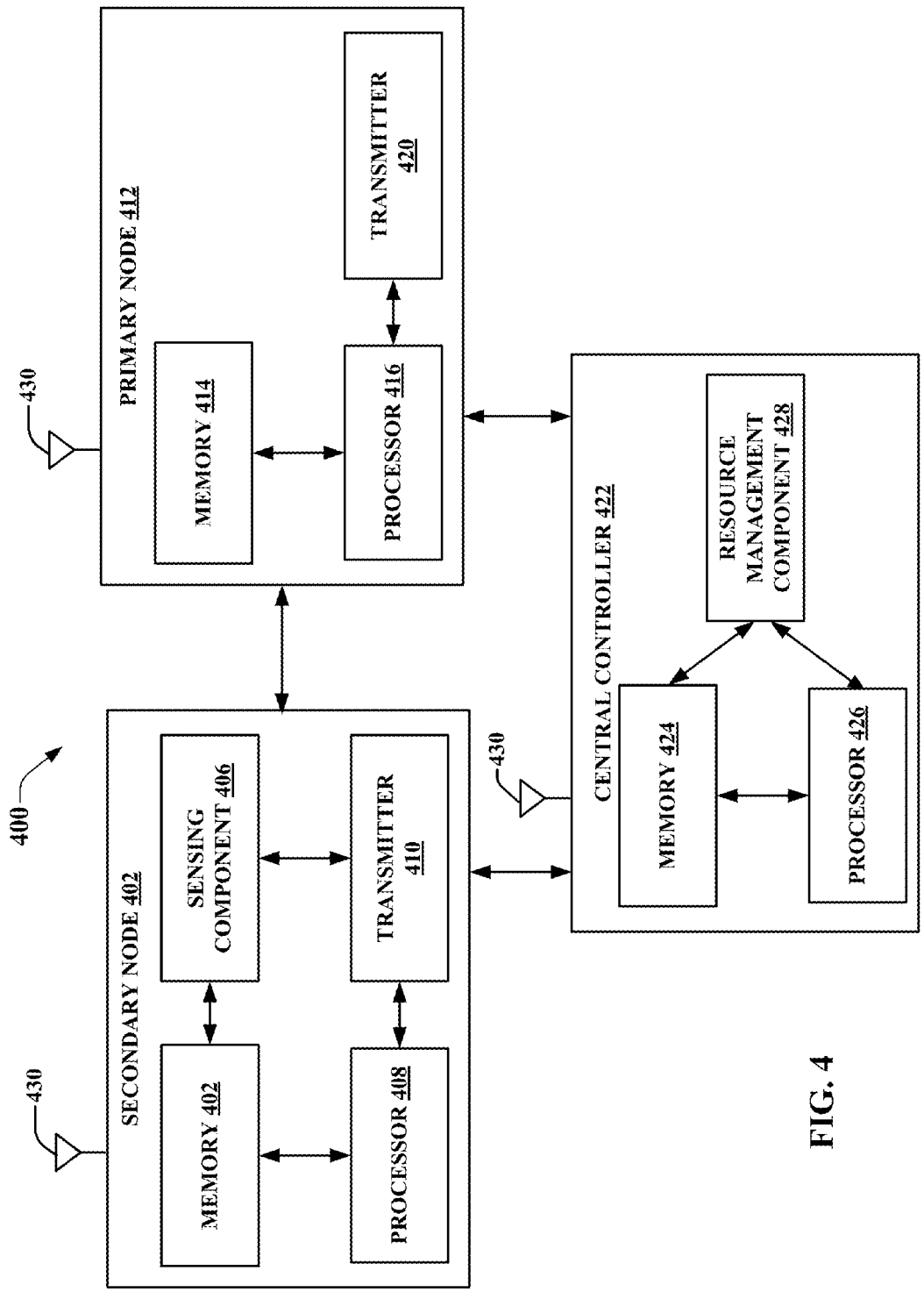
FIG. 4 illustrates a high level functional block diagram of a cognitive radio network including a resource management component in accordance with an embodiment.

Turning to FIG. 4, presented are high level block diagrams of various system elements operable in a CRN system described herein. The various system elements include a secondary node 402, a primary node 412 and a central controller 422. In an aspect, secondary node 402 and primary node 412 constitute network nodes. In cooperative network embodiments, secondary node 402 may be suitable for use as one or more of secondary nodes 102 (FIG. 1), secondary nodes 220 (FIG. 2) and/or secondary nodes 320 (FIG. 3). Primary node 412 may be suitable for use as one or more of primary nodes 108 (FIG. 1), primary nodes 230 (FIG. 2) and/or primary nodes 340 (FIG. 3) and central controller 422 may be suitable for use as central controller 122 (FIG. 1), central controller 210 (FIG. 2), and/or base station 310 (FIG. 3).

Secondary node 402, a primary node 412 and a central controller 422 can include mobile computing devices, or fixed computing devices capable of communicating in a CRN. For example, in an aspect, secondary node 402 and primary node 412 can include mobile user devices, access points, and/or base stations. Central controller 422 can include a media access controller (MAC), or any type of remote controller or management platform capable of providing addressing and channel access control mechanisms that make it possible for network nodes, such as secondary node 402, to communicate within a CRN network. In another aspect, central controller 422 can reside within a secondary node 402. It is noted that a primary node in one embodiment can function as a secondary node in various other embodiments, in accordance with aspects of the subject disclosure.

As seen in FIG. 4, secondary node 402 can include a memory 404, a processor 408, a sensing component 406, a transmitter 410, and one or more antennas 430 for performing signaling protocol (including software defined antennas stored in memory 404). Memory 404 holds instructions for carrying out the operations of sensing component 406 and the transmitter 410, when executed by processor 408. The processor facilitates controlling and processing all onboard operations and functions of the transmitter. Memory 404 interfaces to the processor 408 for storage of data and one or more applications of transmitter 410 and/or sensing component 406. The applications can be stored in the memory 404 and/or in a firmware, and executed by the processor 408 from either or both the memory 404 or/and the firmware (not shown).

Primary node 412 can include a memory 414, a processor 416, transmitter 420, and one or more antennas 430 for performing signaling protocol. Memory 414 holds instructions for carrying out the operations of the transmitter 420, when executed by processor 408. The processor facilitates controlling and processing all onboard operations and functions of the primary node 412. Memory 414 interfaces to the processor 416 for storage of data and one or more applications of transmitter 420. The applications can be stored in the memory 414 and/or in a firmware, and executed by the processor 416 from either or both the memory 414 or/and the firmware (not shown).

Central controller 422 can include a memory 424, a processor 426, and a resource manager component 428 and two or more antennas 430 for performing MIMO signaling protocol. Memory 424 holds instructions for carrying out the operations of the resource manager component 428 when executed by processor 426. The processor facilitates controlling and processing all onboard operations and functions of the controller. Memory 424 interfaces to the processor 426 for storage of data and one or more applications of the transmitter. The applications can be stored in the memory 424 and/or in a firmware, and executed by the processor 426 from either or both the memory 424 or/and the firmware (not shown).

In some embodiments, the central controller 422 is configured to employ resource management component 428 in order to dynamically determine schedule and assign spectral channel sensing. In particular, central controller 422 is configured to identify a number of secondary nodes in a coverage area and identify a number of primary channels in the coverage area. Further, central controller 422 can be configured to determine which (i.e., how many) secondary nodes in a coverage are to perform sensing, as well as how many secondary nodes are to sense select spectral channels. In one aspect, resource management component 428 bases scheduling and assigning on a function of network characteristics and/or a function of a network threshold (e.g., accuracy, throughput, energy consumption, spectral channel exploration, etc.)

Once central controller 422 has determined a schedule and/or assignment, central controller 422 is configured to direct secondary node 402 to perform a spectral channel sensing technique, such as energy detection, cyclostationary detection, matched filer detection, interference temperature detection and the like. In an aspect the central controller 422 is configured to transmit instructions to secondary node 402 comprising a spectral channel to be sensed. Instructions can include encoded, modulated, or protected communications. It is noted, that primary node 430 generally does not perform sensing and is not scheduled to detect characteristics of a network. However, in some embodiments, a primary node can operate as a secondary node to perform sensing and/or to be scheduled to detect characteristics of a network, in accordance with aspects of the subject disclosure.

In another aspect, secondary node 402 and primary node 430 can employ noise reduction techniques and interference mitigation schemes. For example, a node can be configured to maximize the overlap of interference signal subspaces in receivers while ensuring that desired signal vectors at each receiver are linearly independent of the interference subspace. Therefore, each node can zero-force all interference signals without zero-forcing any of the desired signals.

In an embodiment, secondary node 402 can transmit data to other nodes and/or central controller 422. In one aspect, data can correspond to a response from instructions issued by central controller 422. As such, data can include characteristics of a network (such as an indication of a channel busy or idle). Central controller 422 can aggregate responses from one or more nodes and determine the state of a spectral channel based on fault and accuracy schemes. In another aspect, central controller 422 can schedule access to primary channels based on received data. Scheduling access can include scheduling particular nodes to utilize particular spectral channels. In another aspect, central controller 422 can monitor the activity of primary node 430, for example data transmissions of primary node 430

It should be noted that various functions of system 400's component can be employed by any of the node, and/or central controller 422. Although secondary node 402, primary node 412 and central controller 422 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
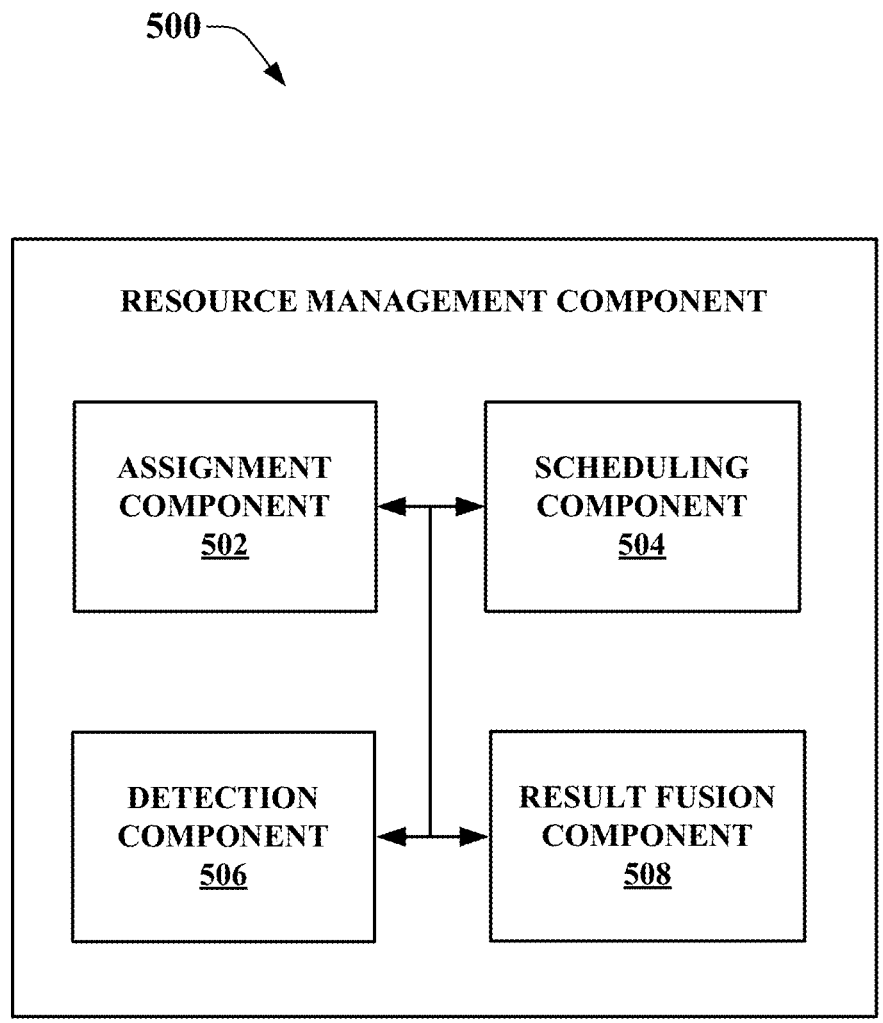
FIG. 5 illustrates a high level functional block diagram of resource management component in accordance with various embodiments

Turning now to FIG. 5, there illustrated is high level block diagrams of a resource management component 500 operable in a CRN system described herein. Several resource management component 500 elements are depicted, including an assignment component 502, a scheduling component 504, a detection component 506, and a result fusion component 508. In various implementations, additional components are utilized. However, for brevity, resource management component 500 is illustrated without additional components. In one aspect, resource management component 500 can be suitable for use as central controller 122 (FIG. 1), central controller 210 (FIG. 2), base station 310 (FIG. 3), and/or central controller 422 (FIG. 4).

In one aspect, assignment component 502 can determine an assignment for secondary users (SUs) to sense primary user (PU) channels for a given number of SUs participated in sensing (i.e., κ). In one aspect, detection component 506 can sense a number of SUs in a given area and can communication the number of SUs to assignment component 502.

In one aspect, assignment component 502 employs an algorithm to determine sensing assignments. In one aspect, combinations (i.e., assigning methods for SUs to sense PU channels) in which exactly i primary channels are sensed form a group $G_i$, $i=1, \ldots, I$, where $I=\min\{k, N\}$ are utilized. Also, denote the number of combinations in group $G_i$, as $|G_i|$. The lth ($l=1, \ldots, |G_i|$) combination in group $G_i$, is denoted as $C_{i,l}=\{a_{i,l}^j\}$ ($j=1, \ldots, i$), where $\{a_{i,l}^j\}$ represents the number of SUs assigned to sense channel j. The superscripts n, which indicate different channels, are omitted when SUs are homogeneous in terms of stationary probabilities and the SNR of the PU signals received at SUs are identical. Further, the derivative of function $f(x)$, with respect to x, can be represented by $\nabla f(x)$ to yield the following. Where m is a continuous variable representing the number of SUs assigned to sense a channel with domain $[1, +\infty)$. Then $P_f(m)$ is decreasing and convex, where m is the number of SUs assigned, if the following condition holds $$\left[\ln(1-p_f(m)) - \frac{m}{1-p_f(m)}\nabla p_f(m)\right]^2 < \frac{2\nabla p_f(m) - m\nabla^2 p_f(m)}{1-p_f(m)} - \left[\frac{\sqrt{m}\,\nabla p_f(m)}{1-p_f(m)}\right]^2.$$

In one aspect, this holds for most practical systems. With the above, scheduling component 502 can optimally assign SUs to sense PU channels according to the algorithms below for $i=1, \ldots, I$, where $C_{i,max}$ denotes the combination that produces the largest value of the objective in group $G_i$, where $$a_{i,max}^j = \left\lceil \frac{\kappa}{i} \right\rceil \text{ or } a_{i,max}^j = \left\lfloor \frac{\kappa}{i} \right\rfloor,$$

$j=1, \ldots, i$
and $\Sigma_j a_{i,max}^j = \kappa$, then $C_{i,max}$ ($i=1, \ldots, I$) has the following property:

$$\Sigma_j P_f(a_{i,max}^j) \leq \Sigma_j P_f(a_{i,l}^j), l=1, \ldots, |G_i|.$$

As a result, assignment component 502 can determine a number of SUs assigned to each channel as either $$\left\lceil \frac{\kappa}{i} \right\rceil \text{ or } \left\lfloor \frac{\kappa}{i} \right\rfloor,$$

where i is the number of sensed PU channels. In other words, SUs are assigned evenly to all the channels that detection component 506 determined to sense.

In another aspect, scheduling component 502 can determine a target number of total spectral channels SUs are assigned to sense in a CRN. In an embodiment, scheduling component 502 can determine whether the condition $2P_f(1) - P_f(2) - 1 < 0$ holds. In another embodiment, the condition can be assumed to hold and the optimal solution, via the utility function described with reference to FIG. 2, can yield a target of $C_{i,max}$ i.e. to assign each SU to sense one different channel respectively. In one aspect, a CRN will reach its capacity in terms of the number of sensed PU channels (i.e., sense I PU channels). In an embodiment, scheduling component 502 can determine a target number of SUs to issue sensing commands based on network thresholds (e.g., balance between sensing energy consumption and expected throughput). A target can be determined via the structure of the utility function described with reference to FIG. 2 (how the utility function varies with respect to different numbers of SUs participated in sensing (κ)). In one aspect, this can be determined with $U(a^*(\kappa),\kappa)$ as the utility function under the optimal SU assigning mechanism for given κ, where N' denotes the number of PU channels selected for sensing. Then $\Delta U(a^*(\kappa),\kappa) \triangleq U(a^*(\kappa+1),\kappa+1) - U(a^*(\kappa),\kappa)$ can be defined as the first difference of function $U(a^*(\kappa), \kappa)$ with respect to κ and $\Delta U(a^*(\kappa),\kappa)$ can be piecewise constant. Accordingly, the first difference of $U(a^*(\kappa),\kappa)$ with respect to κ can be given by $$\Delta U(a^*(\kappa),\kappa) = \alpha \Delta P(a^*(\kappa),\kappa) - \beta,$$

where $$\alpha = w_t \frac{T-\tau-\eta}{T} C_0 Pr(s_n = 0),$$

$\beta=w_e\kappa\phi$, $P(a^*(\kappa),\kappa)=\Sigma_{N:a_n<0}[1-P_f^n(a_n)]$, and $\Delta P(a^*(\kappa),\kappa)$ is the first difference of $P(a^*(\kappa),\kappa)$, which is similarly defined as $\Delta U(a^*(\kappa),\kappa)$. In another aspect, J denotes the quotient and K remainder of the division $$\frac{\kappa}{N'},$$

i.e. $\kappa=JN'+K$. Since $\kappa$ SUs, in total, engage in sensing, K channels are sensed by $$\left\lceil \frac{\kappa}{N'} \right\rceil SUs$$

and (N'−K) channels are sensed by $$\left\lfloor \frac{\kappa}{N'} \right\rfloor SUs.$$

In another aspect, one more SU can participates in sensing and it will be assigned to one of the (N'−K) channels which are sensed by $$\left\lfloor \frac{\kappa}{N'} \right\rfloor SUs.$$

According to the above, the optimal assignment $a^*(\kappa+1)$ is that (K+1) spectral channels are sensed by $$\left\lceil \frac{\kappa}{N'} \right\rceil SUs$$

and (N'−K−1) channels are sensed by $$\left\lfloor \frac{\kappa}{N'} \right\rfloor SUs.$$

Therefore, adding one additional SU to $P(a^*(\kappa),\kappa)$, can give:

$$\Delta P(a*(k),k) \triangleq$$
$$P(a*(k+1),k+1) - P(a*(k),(k) = P_f\left(\left\lceil \frac{k}{N'} \right\rceil\right) - P_f\left(\left\lfloor \frac{k}{N'} \right\rfloor\right).$$

Accordingly, it can be concluded that $\Delta P(a^*(\kappa),\kappa)$ is identical within each interval, where $\kappa \in [(j-1)N', jN'-1]$, $j=1, \ldots, J$. It is worth mentioning that the analysis above reveals that the value of $\Delta P(a^*(\kappa),\kappa)$ only changes when $\kappa$ increases from $jN'$ to $(jN'+1)$, where $j=1, \ldots, J$. We are interested in further exploring how $\Delta P(a^*(\kappa),\kappa)$ changes with respect to $\kappa$, hoping that more insights can be found. Here we use N' to denote the number of PU channels selected to sense. Accordingly a result can be $N'=\min\{M,N\}$. Here we have two scenarios: (1) when $M \leq N$, $\kappa$ PU channels will be sensed, and each channel is sensed only by one SU; (2) when $M>N$, all the PU channels will be sensed and some channels will be cooperatively sensed by more than one SU. For the rest of the paper, we only study the second scenario and assume $M>N$ (i.e., $N'=N$) since the first scenario is a special case of the second one. Then the change for the value of $\Delta P(a^*(\kappa),\kappa)$ when $\kappa$ increases from $(jN-1)$ to $jN$, where $j=1, \ldots, J$ can be given as $\delta_j \triangleq \Delta P(a^*(k), k)_{k=jN-1} - \Delta P(a^*(k), k)_{k=jN}$. Where the properties of $\delta_j$ comprise, $\delta_j$ is positive and monotonically decreasing with respect to j, where $j=1, \ldots, J$.

In another aspect, when $\kappa \leq$, the improvement of $P(a(\kappa),\kappa)$ by adding more SUs results from sensing more channels, while when $\kappa>N$, the improvement is due to improved sensing accuracy caused by cooperative spectrum sensing. Sensing more channels will result in larger improvement on expected throughput than merely improving the sensing accuracy of existing channels. Also, the marginal improvement of expected throughput caused by improved sensing accuracy decreases as $\kappa$ increases. Accordingly, the optimal solution is given by the following where $\kappa^*$ denotes the optimal solution with the following properties. In one aspect, multiple optimal solutions, $\kappa^*=jN, jN+1, \ldots, (j+1)N-1$, exist when the following condition holds $$\Delta P(a^*(\kappa), \kappa)_{k=jN} = \frac{\beta}{\alpha}.$$

While, a single optimal solution, $\kappa^*=jN$, exists when both of the following two conditions hold $$\Delta P(a^*(\kappa), \kappa)_{k=jN-1} > \frac{\beta}{\alpha}, \Delta P(a^*(\kappa), \kappa)_{k=jN} < \frac{\beta}{\alpha}.$$

Result fusion component 508 can collect the results sent to a BS after SUs sense the primary channel. In another aspect, result fusion component can generate decisions on the occupancy state of primary channels using a threshold value of 1 for an "OR" fusion rule, a value of M for an "AND" fusion rule, and a value of M/2 for a "Majority" fusion rule, as described with reference to FIG. 1.

Additionally or alternatively, result fusion component 508 can determine a sensing result. In an aspect, result fusion component 508 determines a result as a one data bit result (e.g., idle or busy). In an aspect, the result can be a "1" or a "0" which represents idle or busy.

Figure 6:
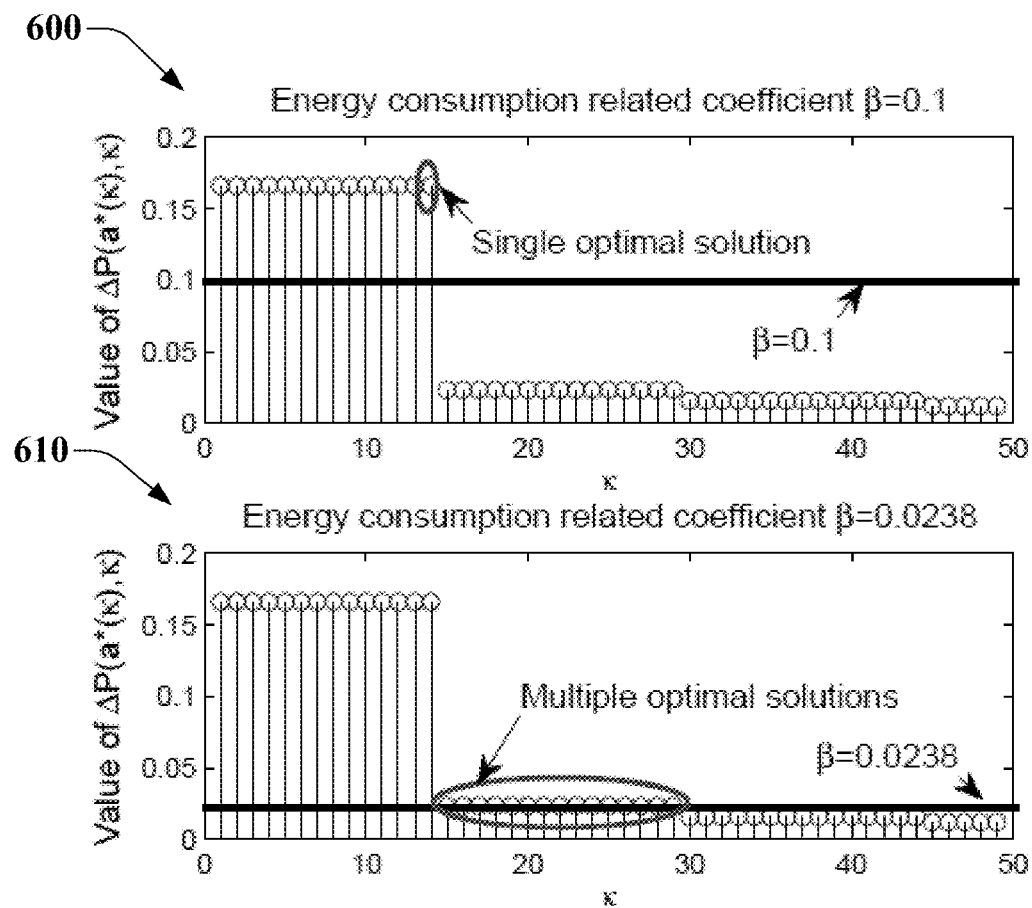
FIG. 6 illustrates a graphical representation of energy consumption as a function of a number of secondary users sensing a number of spectral channels in accordance with various embodiments.

FIG. 6 illustrates energy consumption, $\Delta P(a^*(\kappa),\kappa)$, as a function of a number of users (k) in a CRN in a graph 600 and a graph 610 in accordance with various aspects of this disclosure. For example, system 100 can produce the numerical values illustrated in graph 600 and graph 610. For illustrative purposes, graph 600 and graph 610 assume a frame length is set at T=100 ms, while $\eta=0.1$T and $\tau=5$ ms. Further, N=15 PU channels, the required detection probability of each is $\overline{P}_d=0.9$, and $Pr(s_n=0)=0.7$, $\forall n$. The SNR of the received PU signal is $\gamma=-25$ dB, with sampling rate $f_s=2$ MHz and $C_0=6.6582$. For simplicity, the following is normalized to 1:

$$\alpha = w_t \frac{T-\tau-\eta}{T} C_0 Pr(s_n=0).$$

In the exemplary graphs 600 and 610, it can be seen that the values of $\Delta P(a^*(\kappa),\kappa)$ are piecewise constant. In one aspect, a jumping point occurs when the number of SUs engaged in sensing changes from $\kappa=JN$ to $\kappa=JN+1$, and the improvement of $\Delta P(a^*(k),\kappa)$ at the jumping point, i.e. $\delta_j$, monotonically decreases as $\kappa$ increases. In another aspect, the horizontal lines in both graphs 600 and 610 denote different values of $\beta=w_e\tau\phi$. In graph 600, an optimal solution exists where fifteen SUs are selected to sense all fifteen PU channels, in accordance with various aspects of this disclosure. In graph 610 a $\beta$ value is identical to the improvement of adding one more SU for sensing, within the range of $\kappa=16$ to $\kappa=30$. In this example, as long as the number of SUs is selected within this range, it makes no difference to the objective value of SUs and selected PU channels.

Figure 7:
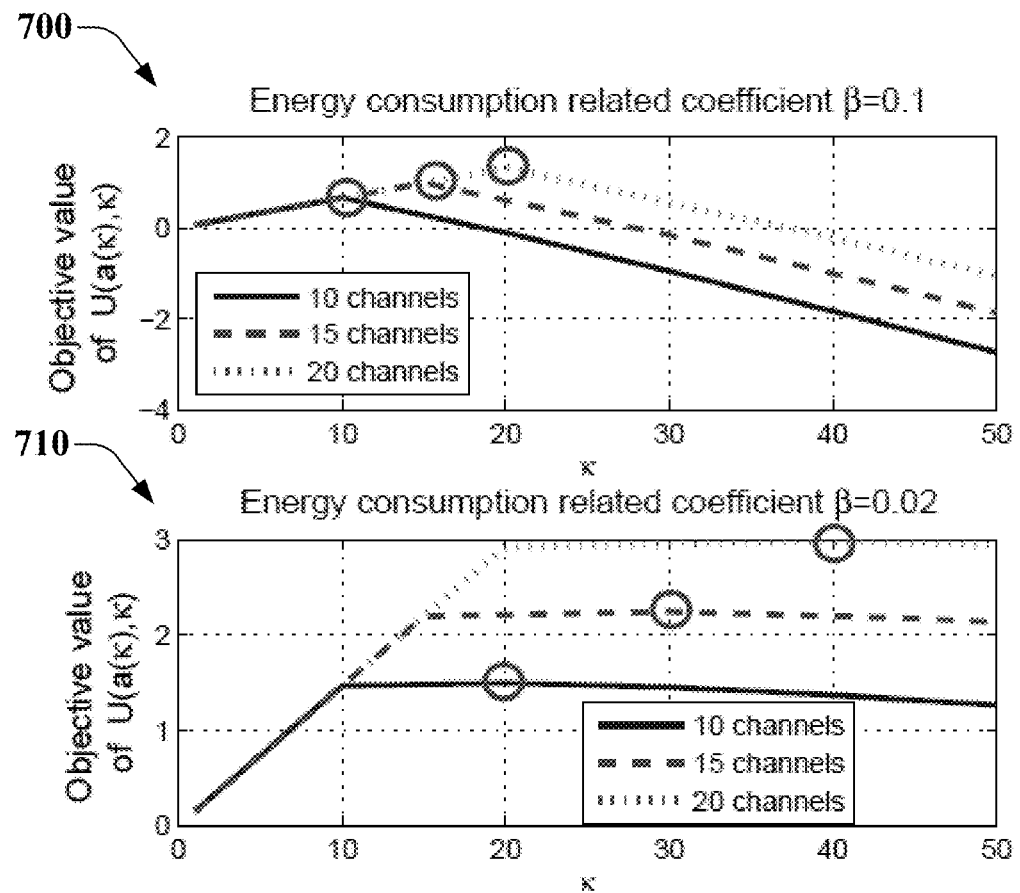
FIG. 7 illustrates a graphical representation of energy consumption as a function of a number of secondary users sensing a number of spectral channels and an objective value of a utility function in accordance with various embodiments.

FIG. 7 illustrates the value of the objective function U(a($\kappa$),$\kappa$) with respect to different number of PU channels and SUs selected for sensing ($\kappa$), in accordance with various aspects of this disclosure. Graph 700 and graph 710 illustrate the objective function as unimodal and possesses a single optimal solution if aspects of this disclosure are applied. It can also be observed that if the total number of PU channels available increases, the optimal objective value increases as well.

Graph 700 and graph 710 both illustrate numerical values in a CRN system at ten, fifteen, and twenty PU channels. Graph 700 produces an energy consumption coefficient ($\beta$) value of 0.1, while graph 710 has a $\beta$ value of 0.02.

In view of the example system(s) and apparatuses described above, example method(s) that can be implemented in accordance with the disclosed subject matter are further illustrated with reference to flowcharts of FIGS. 8-11. For purposes of simplicity of explanation, example methods disclosed herein are presented and described as a series of acts; however, it is noted that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described.

Turning to FIG. 8, with reference to FIGS. 1-5, there illustrated is an exemplary methodology 800 to determine an assignment of SUs to sense the PU channels for a given number of SUs participated in sensing and determine an appropriate number of SUs to participate in sensing so that a desirable balance between sensing energy consumption and expected throughput can be achieved. It is noted that the efficiency of methodology 800 results from using various aspects of this diclosure.

At 810, it is assumed that variables are set in accordance with various aspects of this disclosure. For example, the utility function is denoted as U (described herein), M represents the total number of SUs and N denotes the total number of PU channels. At 820, the given function is iterated until a threshold is reached. It is given that m is the number of SUs assigned to sense each channel, and the loop is executed at most $$\left\lceil \frac{M}{N} \right\rceil$$

times. The optimal solution is found by searching the point where $\Delta P < \lambda$ (i.e., $\Delta U(a^*(\kappa),\kappa)<0$). At 830 J is set to m and then if-else steps are taken at 840. Finally, the method can end at 850.

Figure 9:
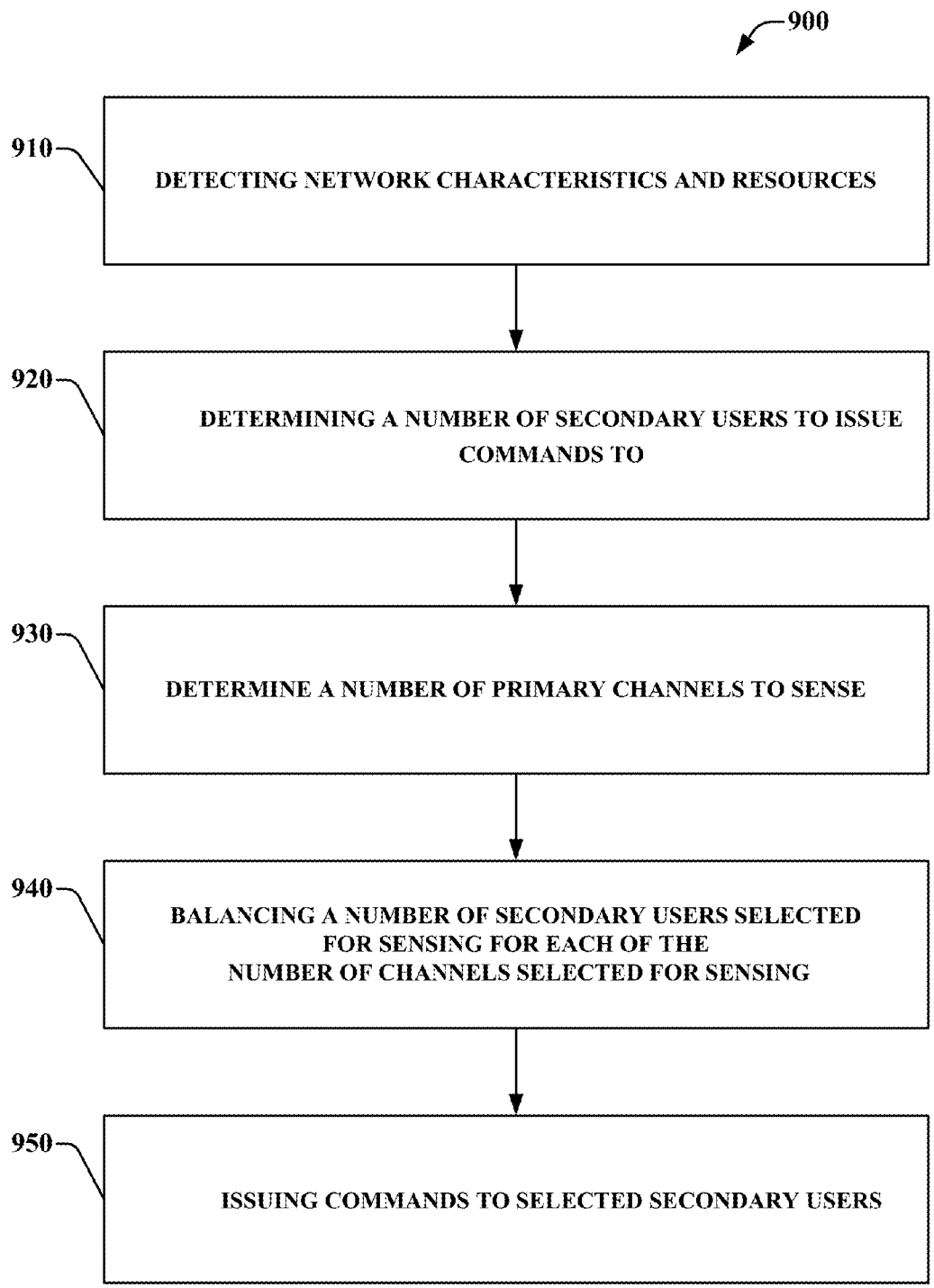
FIG. 9 illustrates a flow diagram of a method for scheduling secondary users to sense primary spectral channels in accordance with an embodiment.

FIG. 9 presents a high level flow diagram of a process 900 for scheduling SUs to sense PU channels in accordance with the subject balancing schemes of this disclosure. At 910 network characteristics and resources are detected (e.g., by central control component 122). In an aspect, 910 can include determining a number of SUs, PUs, PU channels and the like.

At 920, a target number of SUs to issue commands can be determined (e.g., by central control component 122). For example, in an aspect, determining a number of secondary users to issue commands to can comprise determining as a function of network characteristics and target parameters (e.g., energy consumption, network exploration, through put, and accuracy). In one aspect, the number of SUs can be an optimal number of SUs, in accordance with various aspects of this disclosure.

At 930, a number of primary channels to sense can be determined (e.g., by central control component 122). For example, applying various aspects of this disclosure can yield an optimal number of channels to sense based on network characteristics and network parameters.

At 940, a number of secondary users can be selected to sense each of the number of PU cannels (e.g., by central control component 122). For example, balancing a number of secondary users based in part on the number of PU channels to select can result in an optimal CRN configuration.

At 950, commands can be issued to secondary users (e.g., by central control component 122). In one aspect, a command can comprise data indicative of instructions to sense a particular PU channel.

Figure 10:
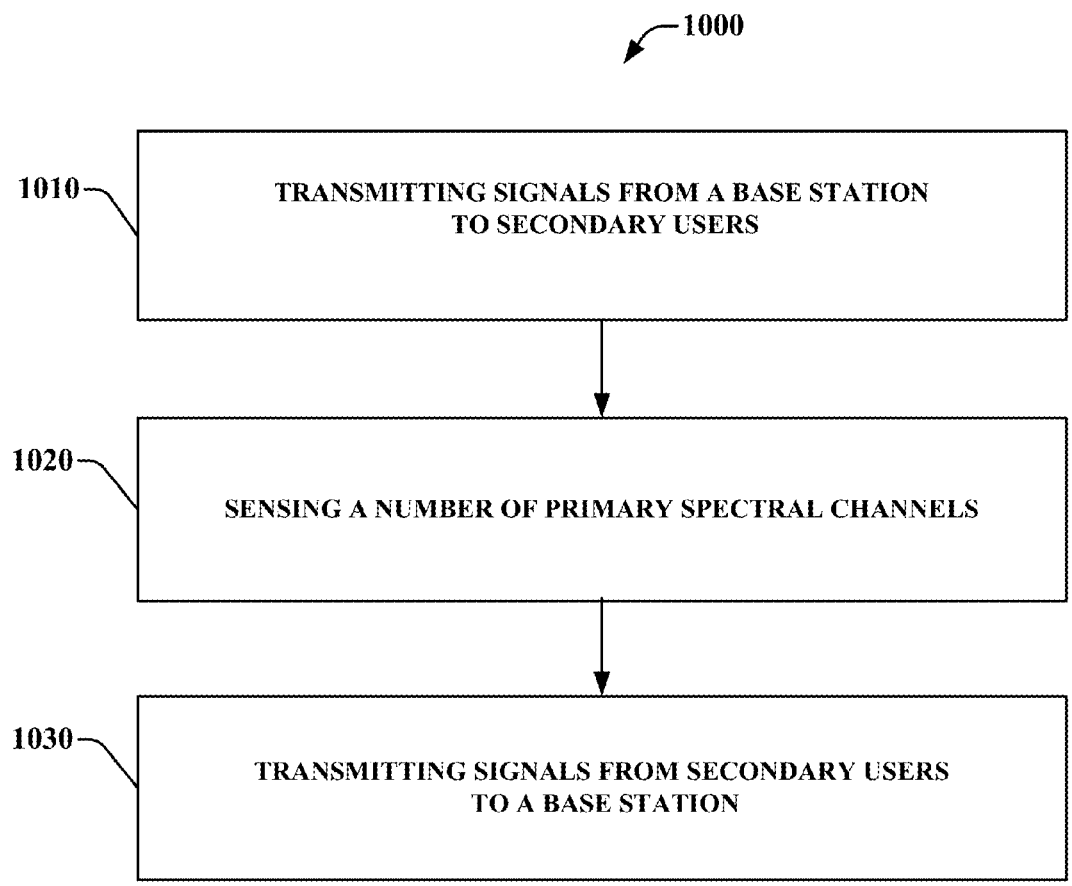
FIG. 10 illustrates a flow diagram of facilitating dynamic sensing of spectral channels in a cognitive radio network including sensing channels in accordance with various embodiments.

FIG. 10 presents a high level flow diagram of a process 1000 for scheduling sensing of PU channels and sensing PU channels in accordance with various aspects of this disclosure. At 1010 the process can begin, where it is assumed that a base station has determined to send data indicative of a command. Further, a signal representing data can be transmitted by a base station (e.g., base station 220) to one or more SUs.

At 1020, a number of primary spectral channels are sensed by SUs according to instructions received by SUs. For example, in an aspect, SUs can respectively sense (e.g., energy sensing) particular spectral channels based on an instruction. Sensing can include determining a status of a spectral channel (e.g., busy or idle).

At 1030, signals can be transmitted from SUs to a base station. For example, SUs can transmit (e.g., wirelessly, wired, cellular, etc.) a response indicating a status of a spectral channel.

Figure 11:
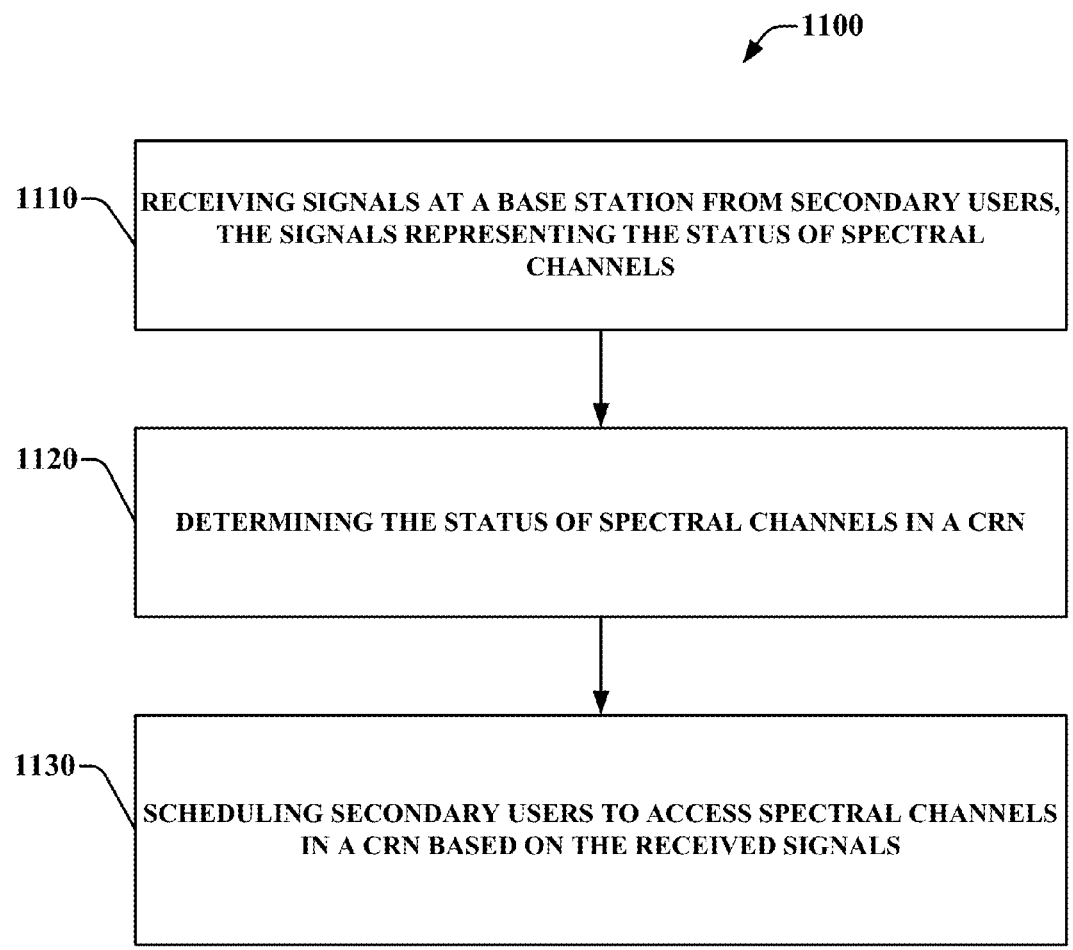
FIG. 11 illustrates a flow diagram of facilitating dynamic sensing of spectral channels in a cognitive radio network including allowing access to primary channels in accordance with various embodiments.

FIG. 11 illustrates a process 1100 for scheduling SUs to access to PU channels, in accordance with various aspects of this disclosure. At 1110, a transmitting device (e.g., SU) transmits signals in subspaces to receiving devices (e.g., base station devices). In one aspect, the signals can represent a result of sensing and indicate the status of a spectral channel. At 1120, a device (e.g., base station device) can determine the status of spectral channels in a CRN based on received data. For example, a plurality of SUs can send a signal indicating a status of a spectral channel and a base station can receive signals. In one aspect, signals can conflict due to inaccuracy of sensing. Accordingly, a base station can apply techniques to determine the actual status of a spectral channel.

At 1130, SUs can be scheduled to access spectral channels in a CRN based on the received results. For example, a base station can allow particular SUs to access a spectral channel if the spectral channel is idle. In one aspect, a base station can apply priority rules to determine which channels can access spectral channels at a particular time.

Figure 12:
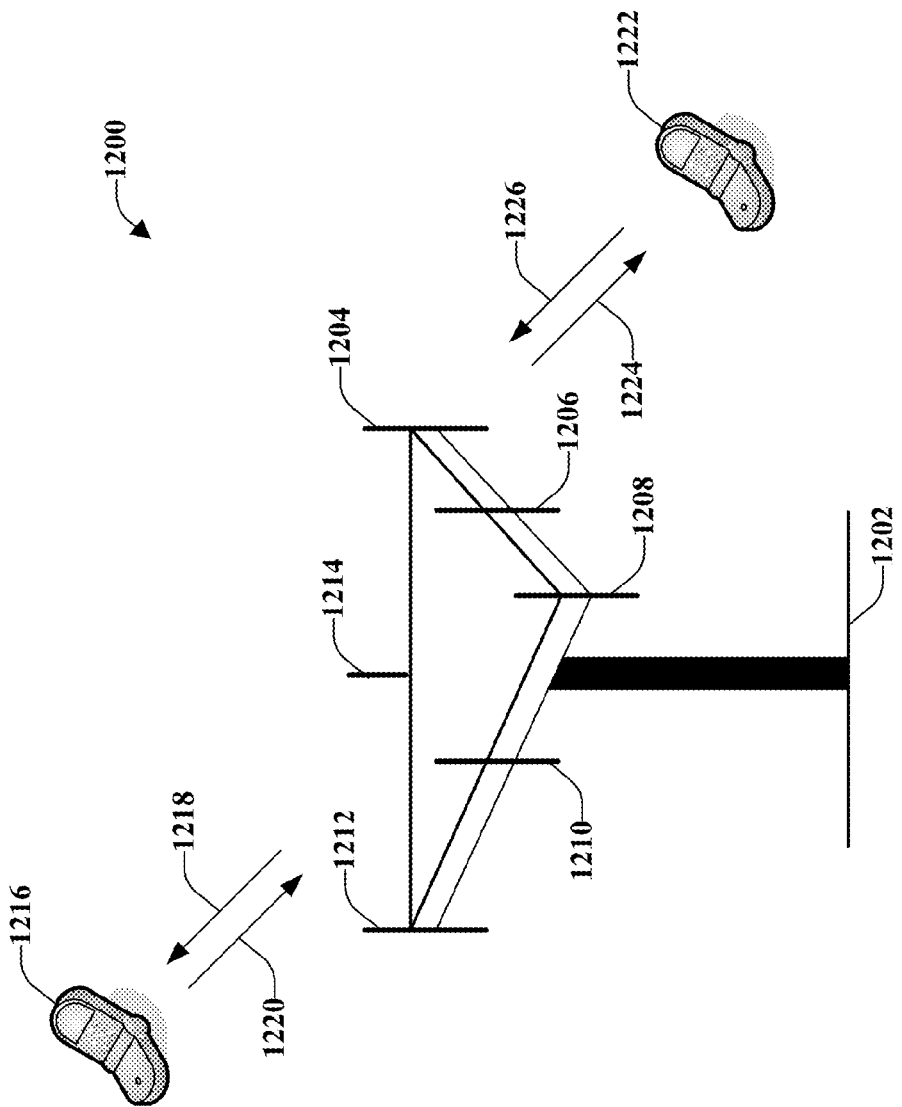
FIG. 12 illustrates an exemplary wireless network environment that can be employed in conjunction with the various systems and methods described herein.

Referring now to FIG. 12 a multiple access wireless communication system 1200 according to one or more aspects is illustrated. A wireless communication system 1200 can include one or more base stations in contact with one or more user devices. Each base station provides coverage for a plurality of sectors. A three-sector base station 1202 is illustrated that includes multiple antenna groups, one including antennas 1204 and 1206, another including antennas 12018 and 1210, and a third including antennas 1212 and 1214. According to the figure, only two antennas are shown for each antenna group, however, more or fewer antennas may be utilized for each antenna group. Mobile device 1216 is in communication with antennas 1212 and 1214, where antennas 1212 and 1214 transmit information to mobile device 1216 over forward link 1218 and receive information from mobile device 1216 over reverse link 1220. Forward link (or downlink) refers to communication link from base stations to mobile devices, and reverse link (or uplink) refers to communication link from mobile devices to base stations. Mobile device 1222 is in communication with antennas 1204 and 1206, where antennas 1204 and 1206 transmit information to mobile device 1222 over forward link 1224 and receive information from mobile device 1222 over reverse link 1226. In a FDD system, for example, communication links 1218, 1220, 1224, and 1226 might utilize different frequencies for communication. For example, forward link 1218 might use a different frequency than the frequency utilized by reverse link 1220.

Each group of antennas and/or the area in which they are designated to communicate may be referred to as a sector of base station 1202. In one or more aspects, antenna groups each are designed to communicate to mobile devices in a sector or the areas covered by base station 1202. A base station may be a fixed station used for communicating with mobile devices.

In communication over forward links 1218 and 1224, transmitting antennas of base station 1202 can utilize beamforming in order to improve a signal-to-noise ratio of forward links for different mobile devices 1216 and 1222. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 13:
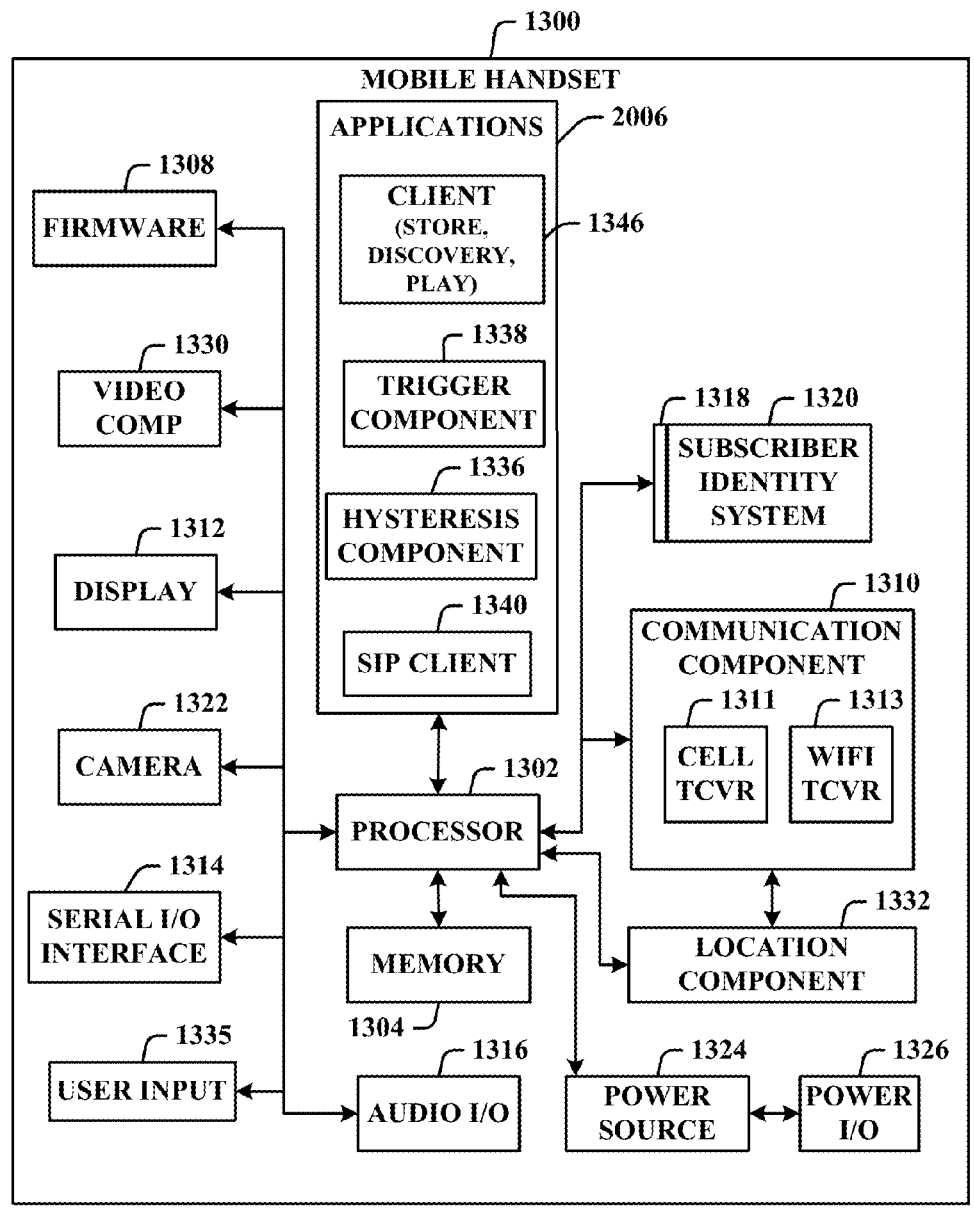
FIG. 13 illustrates an example of a device, e.g., a client device, in accordance with the embodiments disclosed herein.

FIG. 13 illustrates a schematic block diagram of an exemplary device 1300 capable of employing the subject system in accordance with various embodiments. The device is a mobile handset 1300 In order to provide additional context for various aspects thereof, FIG. 13 and the following discussion are intended to provide a brief, general description of a suitable environment 1300 in which the various aspects can be implemented. While the description includes a general context of computer-executable instructions, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, micro-processor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., channel sensing software, user feedback component software, . . . ). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and an unlicensed transceiver 1313 (e.g., WiFi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. The display 1312 can also accommodate the presentation of multimedia content (e.g., music metadata, messages, wallpaper, graphics, . . . ). A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is noted that the SIM card 920 can be manufactured into the handset 1300, and updated by downloading data and software thereto.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1320 (e.g., a camera) can be provided for decoding encoded multimedia content. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. A location tracking component 1332 facilitates geographically locating the handset 1300. As described hereinabove, this can occur when the user initiates the feedback signal automatically or manually. A user input component 1334 facilitates the user initiating the quality feedback signal. The input component can include such conventional input device technologies such as a keypad, keyboard, mouse, stylus pen, and touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the WiFi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 910, includes an indoor network radio transceiver 1313 (e.g., WiFi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
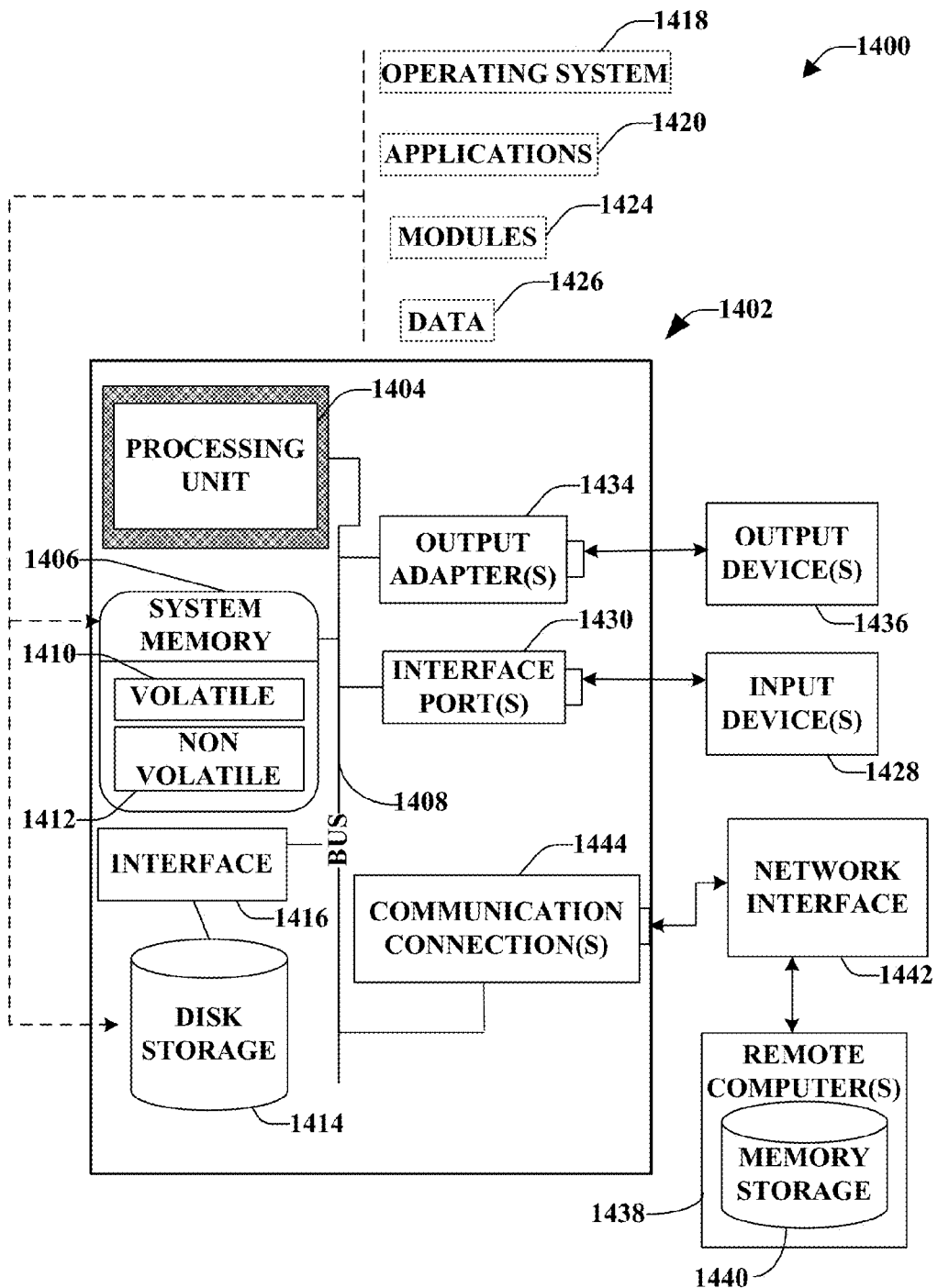
FIG. 14 illustrates an example block diagram of a computer operable to execute various aspects of this disclosure, in accordance with the embodiments disclosed herein.

Referring now to FIG. 14, there is illustrated a block diagram of a computer operable to provide networking and communication capabilities between a wired or wireless communication network and a server and/or communication device.

In order to provide additional context for various aspects thereof, FIG. 14 and the following discussion are intended to provide a brief, general description of a suitable computing environment 1400 in which the various aspects of the various embodiments can be implemented. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (USA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1406 can include volatile memory 1410 and non-volatile memory 1412. The basic input/output system (BIOS), containing the basic routines to transfer information between elements within the computer 1402, such as during start-up, is stored in non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRx SDRAM), and enhanced SDRAM (ESDRAM). Volatile memory 1410 can implement various aspects of this disclosure, including memory systems containing MASCH components.

Computer 1402 may also include removable/non-removable, volatile/non-volatile computer storage media. FIG. 14 illustrates, for example, a disk storage 1414. Disk storage 1414 includes, but is not limited to, devices like a magnetic disk drive, solid state disk (SSD) floppy disk drive, tape drive, Zip drive, LS-100 drive, flash memory card, or memory stick. In addition, disk storage 1414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software, software in execution, hardware, and/or software in combination with hardware that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems. For example, applications 1420 and program data 1426 can include software implementing aspects of this disclosure.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s) 1428. Thus, for example, a USB port may be used to provide input to computer 1402 and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, wired and wireless Ethernet cards, hubs, and routers. It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2300, etc. UTRA includes Wideband-CDMA (W-CDMA) and other variants of CDMA. Further, CDMA2300 covers IS-2300, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.23, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2300 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device: comprising:
   a processor that executes or facilitates execution of computer executable components stored in a computer readable storage medium, the computer executable components comprising:
   a resource management component configured to:
      determine, based on a characteristic of a network, a set of spectral channels to sense within a coverage area of the network, the set comprising a target number of the spectral channels;
      determine, based on the characteristic of the network, a set of node devices for sensing the set of spectral channels, the set of node devices comprising a first target quantity of node devices; and
      determine, based on the characteristic of the network, a subset of node devices, from the set of node devices, for sensing of a spectral channel of the set of spectral channels, the subset comprising a second target quantity of node devices; and
   an assignment component configured to assign, as a function of a parameter of the network, the subset of node devices to the spectral channel of the set of spectral channels, wherein the function is based on a power consumption parameter associated with sensing the set of spectral channels and a sensing accuracy parameter of the set of node device.

2. The device of claim 1, wherein the characteristic of the network includes at least one of a count of node devices in the coverage area, or a total count of spectral channels in the coverage area.

3. The device of claim 1, wherein the resource management component is further configured to determine the set of spectral channels, determine the set of node devices, and determine the subset of node devices for sensing the spectral channel of the set of spectral channels based on a threshold parameter.

4. The device of claim 3, wherein the threshold parameter includes at least one of an energy consumption associated with a spectral channel sensing threshold, a spectral channel exploration threshold, a sensing accuracy threshold, or a network data throughput threshold.

5. The device of claim 1, wherein the assignment component is further configured to assign the subset of node devices to the spectral channel of the set of spectral channels based on the function of the parameter of the network, wherein the function is further based on a data throughput parameter of the network and a total count of spectral channels within the coverage area.

6. The device of claim 1, wherein the computer executable components further comprise:
a detection component configured to detect the characteristic of the network.

7. The device of claim 1, wherein the computer executable components further comprise:
a scheduling component configured to grant, to select nodes of the set of nodes, access to selected spectral channels of the set of spectral channels, based on the selected spectral channels being determined to have another characteristic defining an idle spectral channel.

8. The device of claim 1, wherein the computer executable components further comprise:
a receiver component configured to receive data from the set of node devices, the data indicative of respective statuses of the spectral channels of the set of spectral channels.

9. A method, comprising:
determining a characteristic of a network;
determining, as a function of the characteristic of the network, a set of spectral channels to sense;
determining, as a function of the characteristic of the network, a target quantity of node devices for sensing of the set of spectral channels; and
determining, as a function of a power consumption parameter associated with sensing the set of spectral channels and a sensing accuracy parameter associated with sensing the set of spectral channels, a number of node devices for sensing each spectral channel of the set of spectral channels.

10. The method of claim 9, wherein the determining the set of spectral channels to sense, the determining the target quantity of node devices, and the determining the number of node devices are functions of a trade off management process, wherein the trade off management process applies a function of the characteristic of the network and a threshold of the network.

11. The method of claim 9, further comprising:
receiving data indicative of a status of a spectral channel of the set of spectral channels.

12. The method of claim 11, further comprising:
determining a status of the spectral channel based on the data.

13. The method of claim 12, further comprising:
granting selected node devices access to selected spectral channels of the set of spectral channels based on the selected spectral channels being determined to have another characteristic defining an idle status.

14. The method of claim 9, further comprising:
selecting a node device of the set of node devices to sense the set of spectral channels, wherein the selecting is based on another characteristic of the node device.

15. The method of claim 9, further comprising:
altering access to the set of spectral channels based on priority data defined for the access.

16. A system, comprising:
means for determining a set of spectral channels to sense as a function of a predefined network parameter and a network characteristic;
means for determining a target quantity of node devices to sense the set of spectral channels as a function of the predefined network parameter and the network characteristic; and
means for assigning the target quantity of node devices to a spectral channel of the set of spectral channels as a function of the predefined network parameter and the network characteristic,
wherein the predefined network parameter comprises a power consumption parameter associated with sensing the set of spectral channels and a sensing accuracy parameter associated with sensing the spectral channels.

17. The system of claim 16, wherein the means for determining the target quantity of node devices comprises:
means for determining a total number of node devices for sensing the set of spectral channels; and
means for determining a subtotal of node devices to sense the spectral channel of the set of spectral channels.

18. The system of claim 16, further comprising:
means for determining respective statuses of spectral channels of the set of spectral channels based on data received by the target quantity of node devices.

19. The system of claim 16, wherein the means for determining the set of spectral channels includes means for determining that spectral channels of the set of spectral channels have a first characteristic defining a primary user device channel and the means for determining a target quantity of node devices includes means for determining that node devices of the target quantity of node devices have a second characteristic defining a secondary user device.

20. A non-transitory computer-readable storage medium comprising computer-executable instructions that, in response to execution, cause a device including a processor to perform operations, comprising:
determining, based on a characteristic of a network, a target quantity of spectral channels for sensing from a total quantity of spectral channels in the network;
determining, based on the characteristic of the network, a target quantity of node devices for cooperative sensing;
determining, based on the characteristic of the network, a quantity of node devices for sensing spectral channels of the target quantity of spectral channels; and
assigning, based on a function of parameters of the network, the quantity of node devices to a spectral channel of the target quantity of spectral channel, wherein the parameters of the network comprise a power consumption parameter associated with sensing the set of spectral channels and a sensing accuracy parameter associated with sensing the spectral channels.

21. The non-transitory computer-readable storage medium of claim 20, wherein the operations further comprise:
   determining the target quantity of spectral channels as a function of the total quantity of spectral channels in a network and a total quantity of node devices in the network.

22. The non-transitory computer-readable storage medium of claim 20, wherein the operations further comprise:
   balancing, based on a predetermined threshold, the power consumption parameter associated with sensing the spectral channels and the accuracy parameter associated with sensing the spectral channels.

23. The non-transitory computer-readable storage medium of claim 22, wherein the balancing further comprises:
   balancing, based on the predetermined threshold, the target quantity of spectral channels, the target quantity of node devices for cooperative sensing, and the quantity of node devices for sensing the spectral channels of the target quantity of spectral channels.

24. The non-transitory computer-readable storage medium of claim 20, wherein the operations further comprise:
   determining noise associated with an electromagnetic interference present in a spectral channel of the target quantity of spectral channels.

25. The non-transitory computer-readable storage medium of claim 20, wherein the operations further comprise:
   determining signal-to-noise ratios (SNRs) associated with the spectral channels.

26. The non-transitory computer-readable storage medium of claim 20, wherein the operations further comprise:
   issuing a sense command to a node device of the target quantity of node devices.

* * * * *